US011206153B2

(12) United States Patent
Piaskowski et al.

(10) Patent No.: US 11,206,153 B2
(45) Date of Patent: Dec. 21, 2021

(54) BUILDING MANAGEMENT SYSTEM WITH ADVANCED SEARCH ACTIONS AND BULK COMMANDS

(71) Applicant: Johnson Controls Technology Company, Auburn Hills, MI (US)

(72) Inventors: Ryan A. Piaskowski, Milwaukee, WI (US); Suvidha Raina, Roop Nagar (IN); Ann M. Cook, Hartland, WI (US); Michael N. Offenbacher, Waukesha, WI (US); Mohit Goel, Kaithal (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 376 days.

(21) Appl. No.: 16/100,962

(22) Filed: Aug. 10, 2018

(65) Prior Publication Data

US 2019/0052479 A1 Feb. 14, 2019

Related U.S. Application Data

(60) Provisional application No. 62/545,073, filed on Aug. 14, 2017.

(51) Int. Cl.
*H04L 12/28* (2006.01)
*G06F 16/951* (2019.01)
(Continued)

(52) U.S. Cl.
CPC ...... *H04L 12/2827* (2013.01); *G06F 16/9038* (2019.01); *G06F 16/90335* (2019.01);
(Continued)

(58) Field of Classification Search
CPC . G09B 29/007; G06F 16/951; G06F 16/9038; G06F 16/90335; G06Q 10/06;
(Continued)

(56) References Cited

U.S. PATENT DOCUMENTS 8,788,097 B2 7/2014 Drees et al.
9,703,276 B2 7/2017 Piaskowski et al.
(Continued)

OTHER PUBLICATIONS

Non-Final Office Action on U.S. Appl. No. 16/427,056, dated Aug. 31, 2020, 8 pages.

*Primary Examiner* — Nicholas R Taylor
*Assistant Examiner* — Michael Li
(74) *Attorney, Agent, or Firm* — Foley & Lardner LLP

(57) ABSTRACT

A building management system includes a search and control system coupled to a building network. The building network includes a plurality of devices of building equipment that operate to affect a variable state or condition within a building. The search and control system is configured to provide a search interface, receive filter criteria, perform a search regarding the devices of building equipment based on the filter criteria, return a set of search results based on the filter criteria, receive a selection of one or more devices of building equipment of the set of search results, receive command criteria regarding a command to provide to the one or more selected devices of building equipment, and provide the command to the one or more selected devices of building equipment. The command causes the one or more selected devices of building equipment to affect the variable state or condition within the building.

19 Claims, 20 Drawing Sheets

(51) Int. Cl.
*G06F 16/903* (2019.01)
*G06F 16/9038* (2019.01)

(52) U.S. Cl.
CPC ........ *G06F 16/951* (2019.01); *H04L 12/2809* (2013.01); *H04L 12/2812* (2013.01)

(58) Field of Classification Search
CPC .. H02J 3/003; H04L 12/2809; H04L 12/2812; H04L 12/2827
See application file for complete search history.

(56) References Cited

U.S. PATENT DOCUMENTS

| | | | | |
|---|---|---|---|---|
| 10,091,014 | B2 | 10/2018 | Dawes et al. | |
| 10,528,020 | B2 | 1/2020 | Drees | |
| 10,648,688 | B2 | 5/2020 | Przybylski et al. | |
| 2006/0058923 | A1 | 3/2006 | Kruk et al. | |
| 2008/0209342 | A1* | 8/2008 | Taylor | H04L 12/283 715/747 |
| 2011/0178977 | A1* | 7/2011 | Drees | G06Q 10/06 706/52 |
| 2012/0101637 | A1 | 4/2012 | Imes et al. | |
| 2012/0259583 | A1 | 10/2012 | Noboa et al. | |
| 2014/0316743 | A1 | 10/2014 | Drees et al. | |
| 2015/0293508 | A1 | 10/2015 | Piaskowski et al. | |
| 2015/0323915 | A1 | 11/2015 | Warren et al. | |
| 2017/0307243 | A1 | 10/2017 | Burt et al. | |
| 2018/0205567 | A1 | 7/2018 | Piaskowski et al. | |
| 2018/0259927 | A1 | 9/2018 | Przybylski et al. | |
| 2019/0052479 | A1 | 2/2019 | Piaskowski et al. | |
| 2020/0125059 | A1 | 4/2020 | Drees | |
| 2020/0125619 | A1* | 4/2020 | Brette | G06F 16/316 |
| 2020/0358630 | A1 | 11/2020 | Deligio et al. | |

* cited by examiner

| TYPE | NAME | ITEM REFERENCE | VALUE | UNITS | STATUS | SPACE(S)/EQUIPMENT |
|---|---|---|---|---|---|---|
| ■ | BV1 | Dew-pc1:Dew-NAE3511/Programming.BV1 | Active | | NORMAL | ■ 2 Spaces<br>✱ ProgrammingDS2NAE35 |
| ■ | AV1 | Dew-pc1:Dew-NAE3511/Programming.SchedPoints.AV1 | 787.0 | | NORMAL | ■ 2 Spaces<br>✱ NQuipped |
| ■ | BV1 | Dew-pc1:Dew-NAE3511/Programming.SchedPoints.BV1 | Active | | NORMAL | ■ 2 Spaces<br>✱ NQuipped |
| ■ | MV1 | Dew-pc1:Dew-NAE3511/Programming.SchedPoints.MV1 | Active | | NORMAL | ■ 2 Spaces<br>✱ NQuipped |
| ■ | SPACE TEMP, OBJID: 3011773 | Dew-pc1:Dew-NAE3511/FC-1.HRU-CO2.Analog Values.AI-3 | ??? 0.0 | | OFFLINE | ■ TanuTest<br>✱ TANUTest |
| ■ | EFFDATEMP OBJID: 3011815, OBJID:7 | Dew-pc1:Dew-NAE3511/FC-1.HRU-CO2.Analog Values.AV-7 | ??? 0.0 | | OFFLINE | ■ TanuTest<br>✱ TANUTest |
| ■ | TEST | Dew-pc1:Dew-NAE3511/FC-1.HRU-CO2.Analog Values.AV-6 | ??? 0.0 | | OFFLINE | ■ TanuTest<br>✱ TANUTest |
| ■ | TEST2 | Dew-pc1:Dew-NAE3511/FC-1.HRU-CO2.Analog Values.AV-5 | ??? 0.0 | | OFFLINE | ■ TanuTest<br>✱ TANUTest |
| ■ | OCCHEATSP OBJID: 3011787 | Dew-pc1:Dew-NAE3511/FC-1.HRU-CO2.Analog Values.AV-4 | ??? 0.0 | | OFFLINE | ■ TanuTest<br>✱ TANUTest |
| ■ | TEST1 | Dew-pc1:Dew-NAE3511/ | ??? 0.0 | | OFFLINE | ■ TanuTest |

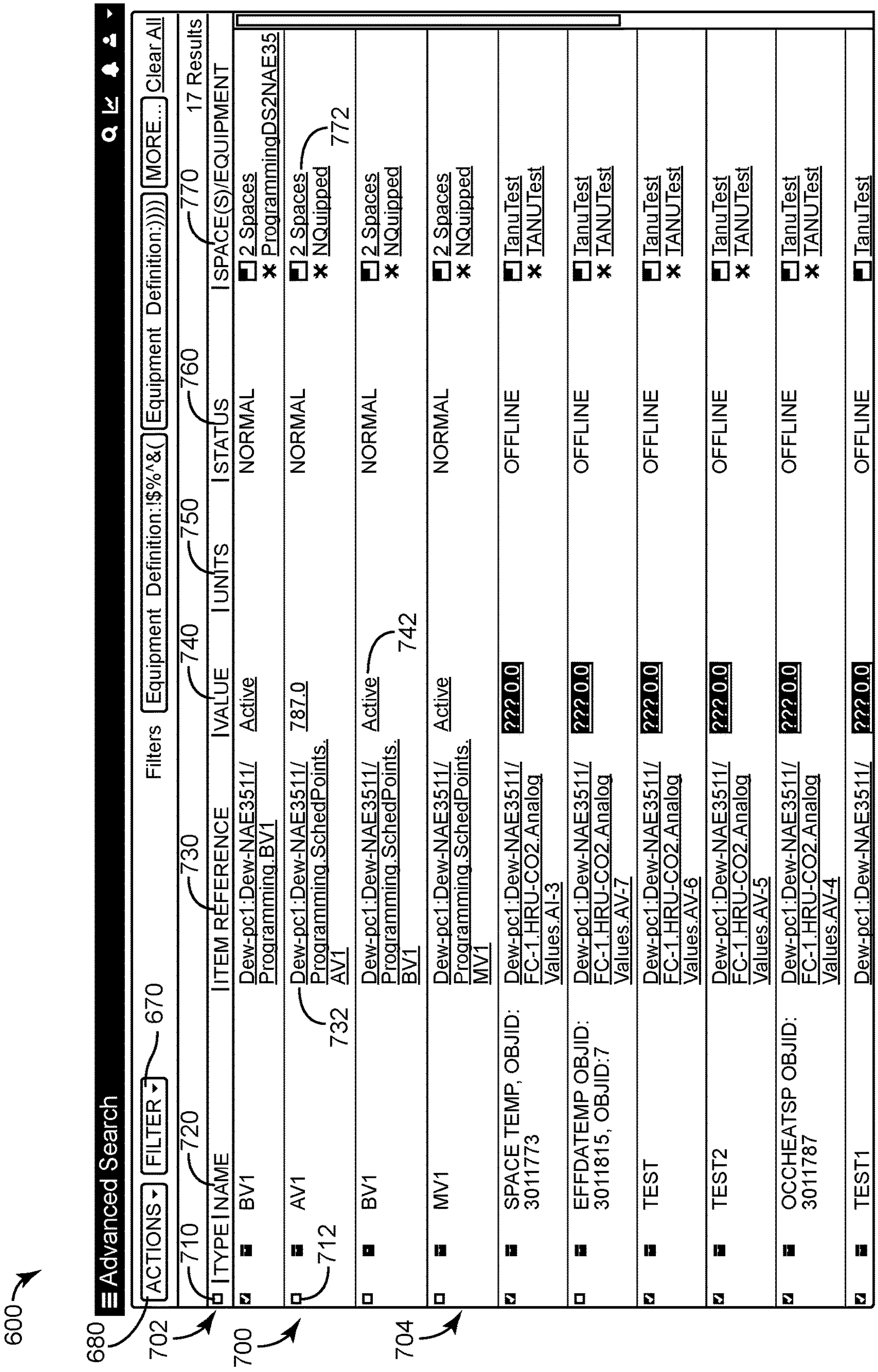

FIG. 7

BUILDING MANAGEMENT SYSTEM WITH ADVANCED SEARCH ACTIONS AND BULK COMMANDS

CROSS-REFERENCE TO RELATED PATENT APPLICATION

This application claims the benefit of U.S. Provisional Patent Application No. 62/545,073, filed Aug. 14, 2017, which is incorporated herein by reference in its entirety.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

SUMMARY

One implementation of the present disclosure is a building management system. The building management system includes a search and control system comprising a processing circuit coupled to a building network. The building network includes a plurality of devices of building equipment that operate to affect a variable state or condition within a building. The search and control system is configured to provide a search interface having a filter section and a results section; receive filter criteria within the filter section including at least one of a space filter, a space type filter, an equipment filter, an object type filter, an equipment definition filter, a point name filter, or a network item filter; perform a search regarding the plurality of devices of building equipment based on the filter criteria; return a set of search results within the results section based on the filter criteria; receive a selection of one or more devices of building equipment of the set of search results in the results section; receive command criteria regarding a command to provide to the one or more selected devices of building equipment; and provide the command to the one or more selected devices of building equipment, the command causing the one or more selected devices of building equipment to affect the variable state or condition within the building.

Another implementation of the present disclosure is a method for generating a report based on search results. The method includes automatically detecting, by a search and control system coupled to a building network, a plurality of items connected to the building network, the plurality of items including at least one of building equipment, data points provided by the building equipment, and building spaces affected by the building equipment; providing, by a search and control system on a user device, a search interface having a filter section and a results section; receiving, by the search and control system from the user device, filter criteria within the filter section regarding the plurality of items; performing, by the search and control system, a search regarding the plurality of items based on the filter criteria; returning, by the search and control system, a set of search results within the results section based on the filter criteria and an authorization level of a user of the user device; receiving, by the search and control system from the user device, a selection of one or more items of the set of search results in the results section; receiving, by the search and control system from the user device, report criteria regarding a report to be generated for the one or more items of the set of search results associated with the selection; and generating, by the search and control system, the report based on the report criteria for viewing on the user device Another implementation of the present disclosure is a method for performing a bulk command process on search results. The method includes providing, by a search and control system on a user device, a search interface having a filter section and a results section, wherein the search and control system is coupled to a building network including a plurality of devices of building equipment that operate to affect a variable state or condition within a building; receiving, by the search and control system from the user device, filter criteria within the filter section regarding the plurality of devices of building equipment; performing, by the search and control system, a search regarding the plurality of devices of building equipment based on the filter criteria; returning, by the search and control system, a set of search results within the results section based on at least one of the filter criteria and an authorization level of a user of the user device; receiving, by the search and control system from the user device, a selection of a plurality of items of the set of search results in the results section; receiving, by the search and control system from the user device, command criteria regarding a bulk command to provide to the plurality of devices of building equipment associated with the selected items of the set of search results; and providing, by the search and control system, the bulk command to the plurality of devices of building equipment associated with the selected items of the set of search results, the bulk command causing the plurality of devices of building equipment associated with the selected items of the set of search results to affect the variable state or condition within the building.

Another implementation of the present disclosure is a building management system. The building management system includes a search and control system comprising a processing circuit coupled to a building network. The building network includes a plurality of devices of building equipment that operate to affect a variable state or condition within a building. The search and control system is configured to provide a search interface having a filter section and a results section; receive filter criteria within the filter section including at least one of space information, equipment information, an object type, an equipment definition, a point name, and a network item; perform a search regarding the plurality of devices of building equipment based on the filter criteria; return a set of search results within the results section based on the filter criteria; receive a selection of one or more devices of building equipment of the set of search results in the results section; receive modification criteria regarding at least one attribute of the one or more selected devices of building equipment to be modified; and perform a modification on the at least one attribute of the one or more selected devices of building equipment based on the modification criteria, the modification causing the at least one attribute of the one or more selected devices of building equipment to change.

Another implementation of the present disclosure is a building management system. The building management system includes a search and control system comprising a processing circuit coupled to a building network. The building network includes a plurality of devices of building equipment that operate to affect a variable state or condition within a building. The search and control system is configured to provide a search interface having a filter section and a results section; receive filter criteria within the filter section including at least one of space information, equipment information, an object type, an equipment definition, a point name, and a network item; perform a search regarding the plurality of devices of building equipment based on the filter criteria; return a set of search results within the results section based on the filter criteria; identify one or more devices of building equipment associated with each of the search results; and aggregate or group a set of search results based on the identified devices of building equipment associated with each of the search results.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 7 is an illustration of the search GUI of FIG. 6 having search results in the results area, according to some embodiments.

DETAILED DESCRIPTION

Building Management System and HVAC System

Figure 1:
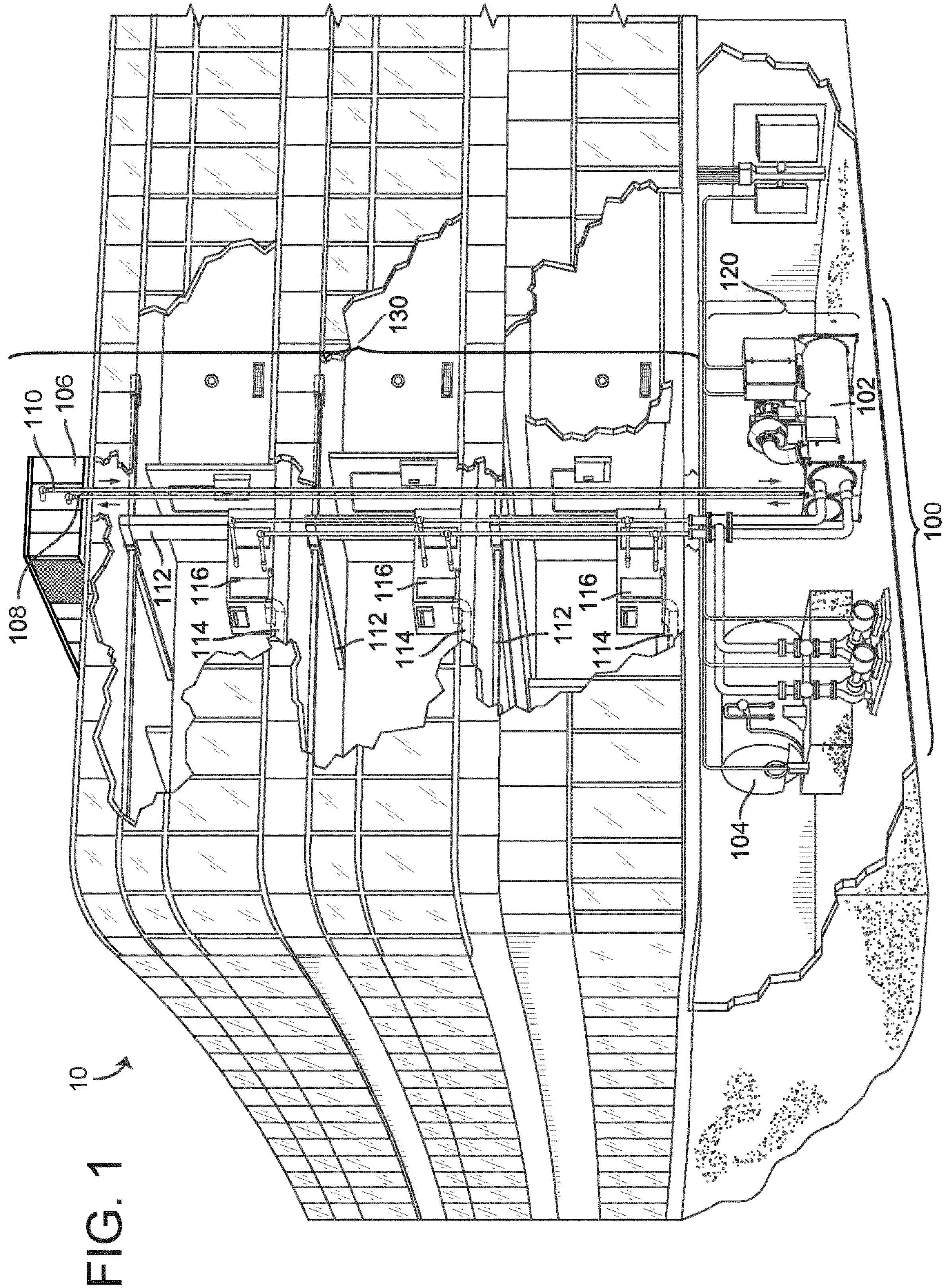
FIG. 1 is a drawing of a building equipped with a building management system (BMS) and a HVAC system, according to some embodiments.

Referring now to FIGS. 1-4, an example building management system (BMS) and HVAC system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
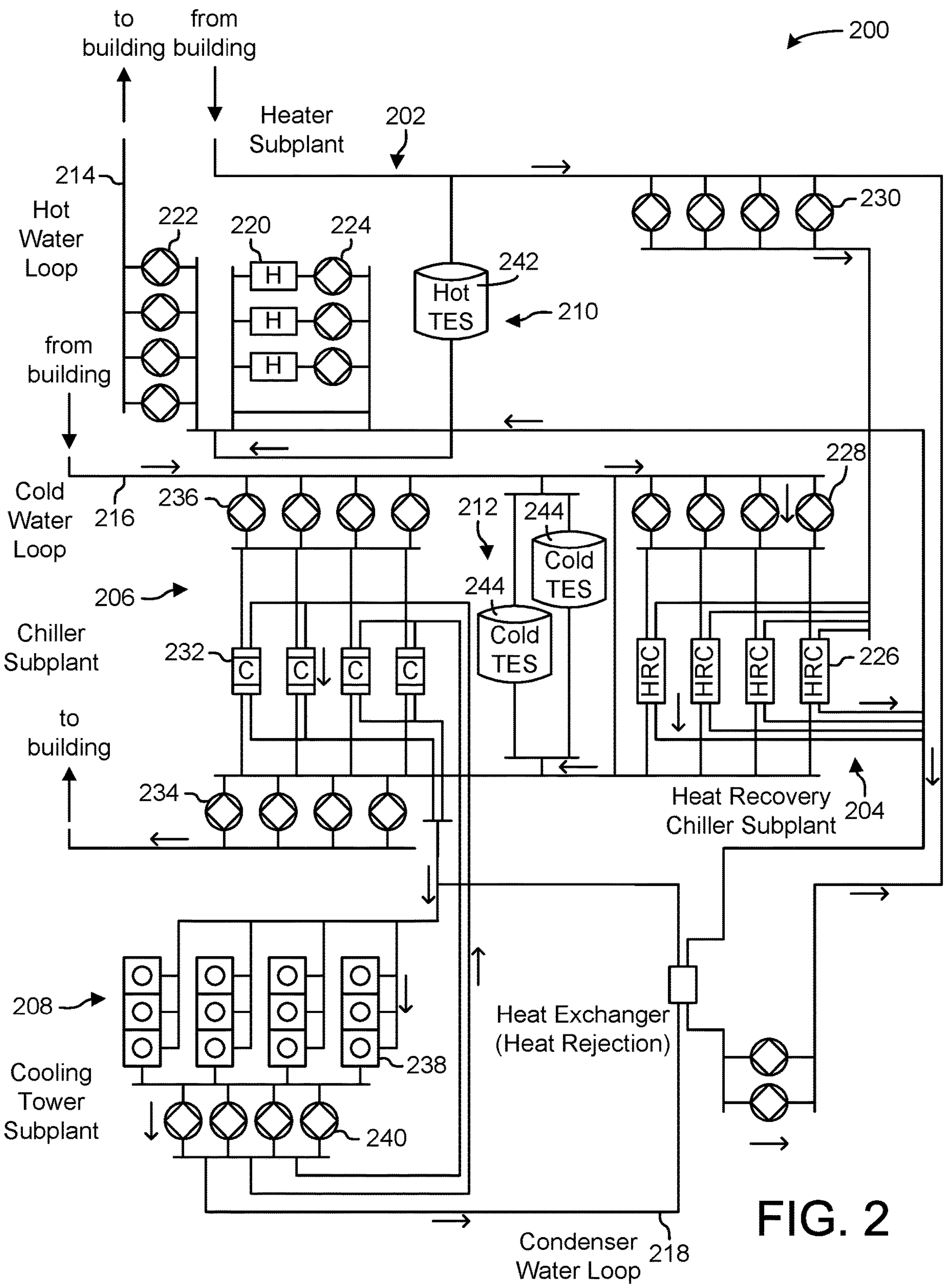
FIG. 2 is a schematic of a waterside system which can be used as part of the HVAC system of FIG. 1, according to some embodiments.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
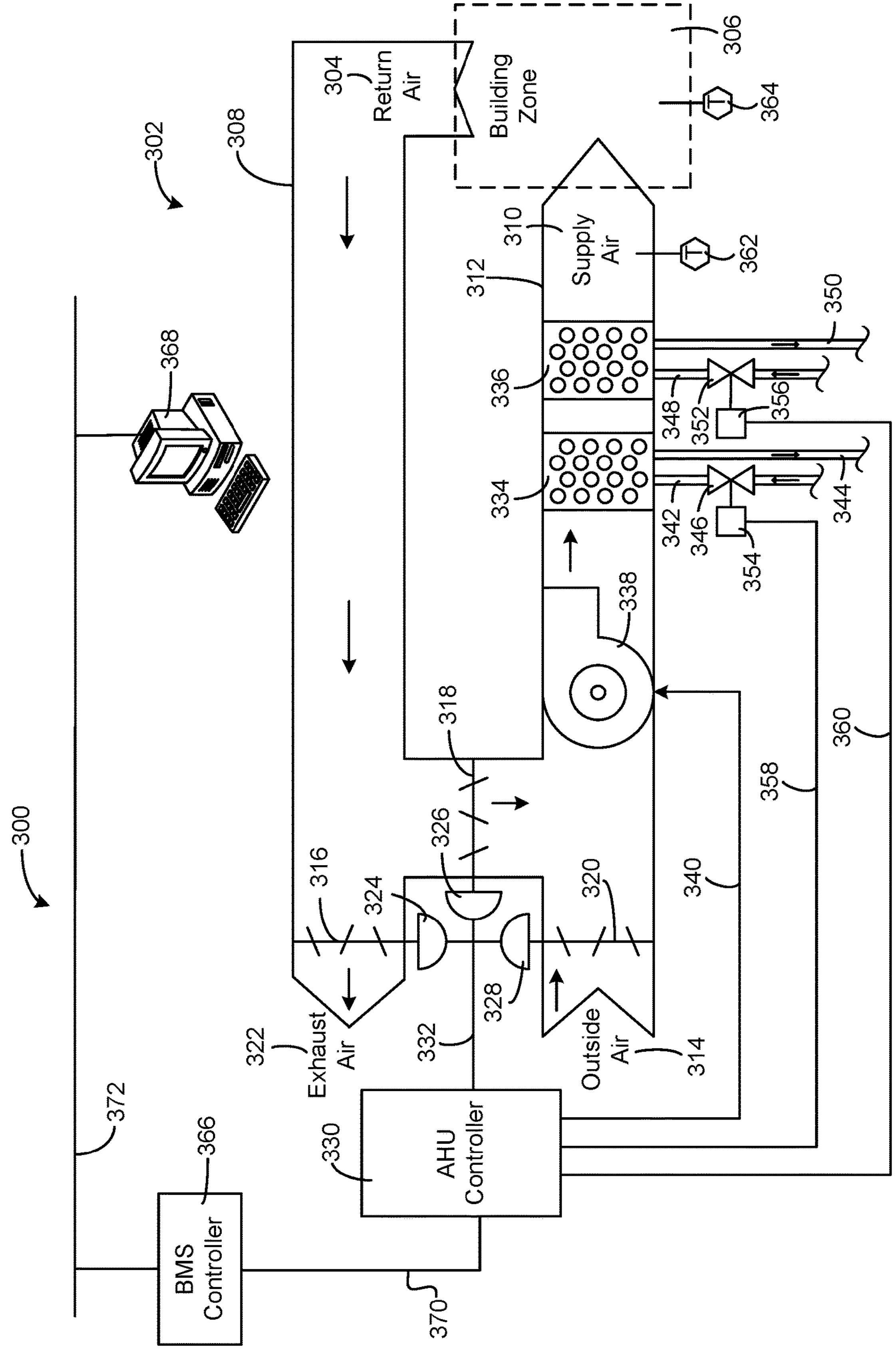
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
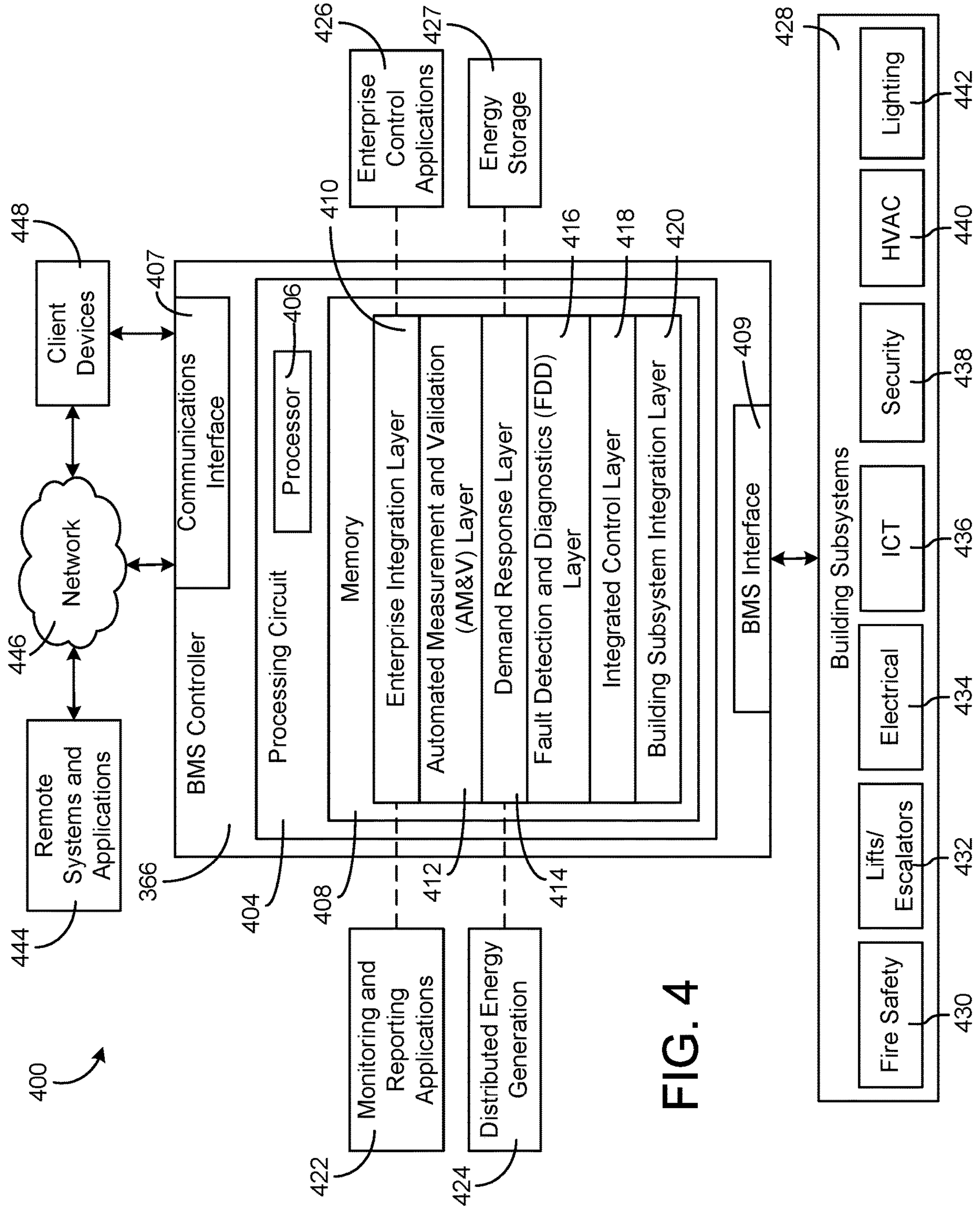
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM & V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM & V) layer 412 can be configured to verify that control strategies commanded by integrated control layer 418 or demand response layer 414 are working properly (e.g., using data aggregated by AM & V layer 412, integrated control layer 418, building subsystem integration layer 420, FDD layer 416, or otherwise). The calculations made by AM & V layer 412 can be based on building system energy models and/or equipment models for individual BMS devices or subsystems. For example, AM & V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Global Search and Control System

Figure 5:
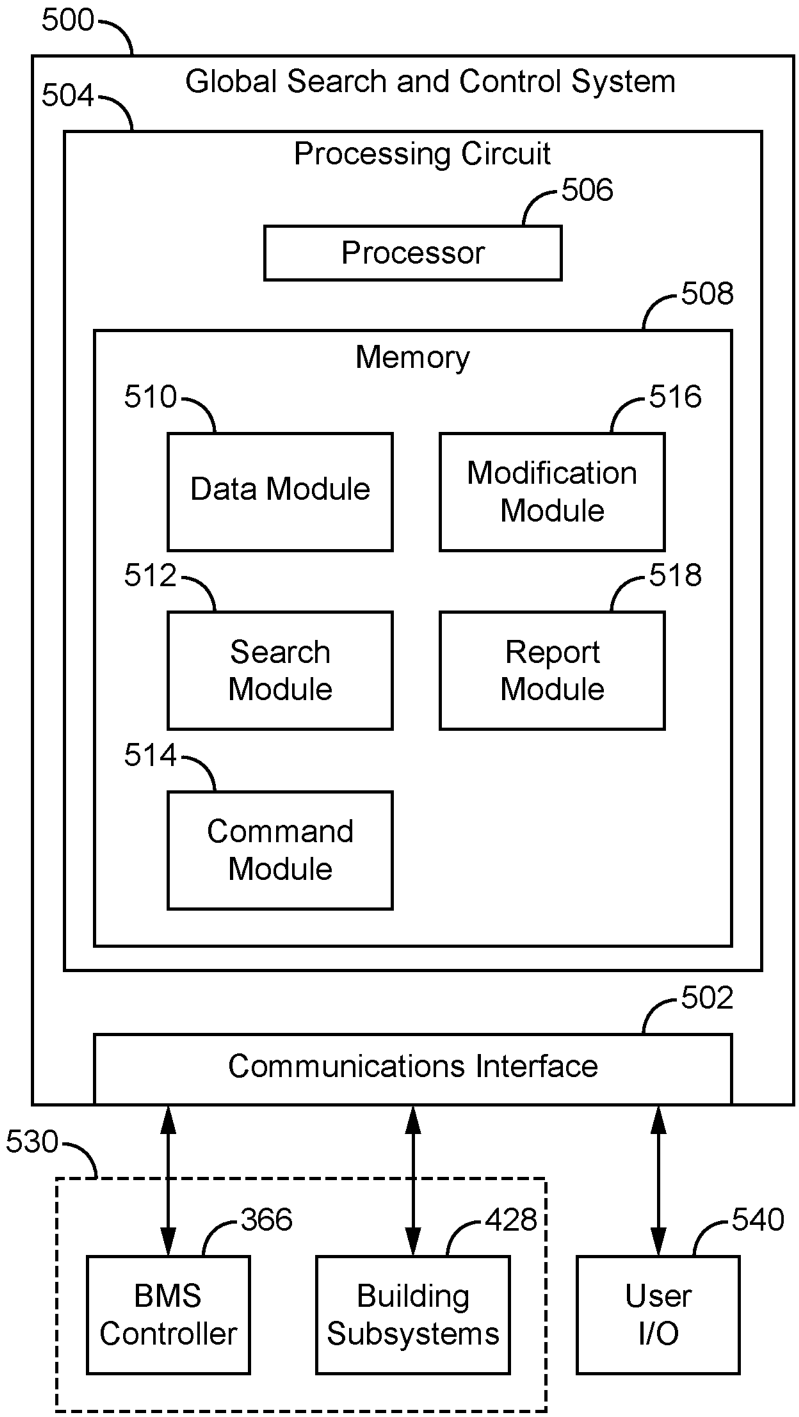
FIG. 5 is a block diagram of a global search and control system, according to some embodiments.

According to the exemplary embodiment shown in FIGS. 5, a search and control system, shown as global search and control system 500, is configured to communicate with a building network 530. Building network 530 may include BMS 400 (e.g., BMS controller 366, building subspaces 428, etc.) and/or any items (e.g., spaces, equipment, objects, points, etc.) of a building that global search and control system 500 is associated with. Global search and control system 500 may be configured to provide various reporting capabilities regarding the items and/or facilitate providing commands (e.g., bulk commands, individual commands, etc.) to one or more of the items (e.g., spaces, equipment, objects, points, etc.) connected therewith.

As shown in FIG. 5, global search and control system 500 includes a communications interface 502 and processing circuit 504 having a processor 506 and a memory 508. Processing circuit 504 can be communicably connected to communications interface 502 such that processing circuit 504 and the various components thereof can send and receive data via communications interface 502 (e.g., to/from building network 530, etc.). Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to an example embodiment, memory 508 is communicably connected to processor 506 via processing circuit 504 and includes computer code for executing (e.g., by processing circuit 504 and/or processor 506) one or more processes described herein. In some embodiments, global search and control system 500 is implemented within a single computer (e.g., one server, one housing, etc.). In various other embodiments, global search and control system 500 can be distributed across multiple servers or computers (e.g., that can exist in distributed locations).

Still referring to FIG. 5, memory 508 is shown to include a data module 510, a search module 512, a command module 514, a modification module 516, and a report module 518. Modules 510-518 can be configured to receive inputs from and/or send outputs to building network 530 (e.g., building subsystems 428, BMS controller 366, etc.), a user input/output (I/O) device 540, and other data sources and provide searching, reporting, and/or command capabilities. The following paragraphs describe some of the general functions performed by each module 510-518 of global search and control system 500.

Data module 510 may be configured to receive and/or store various data regarding components of the building network 530. By way of example, data module may 510 have access to information regarding spaces, equipment, objects, items, points, etc. of building network 530 and the associations therebetween. Data module 510 may receive the information directly from the components of building subsystems 428 and/or BMS controller 366.

Figure 6:
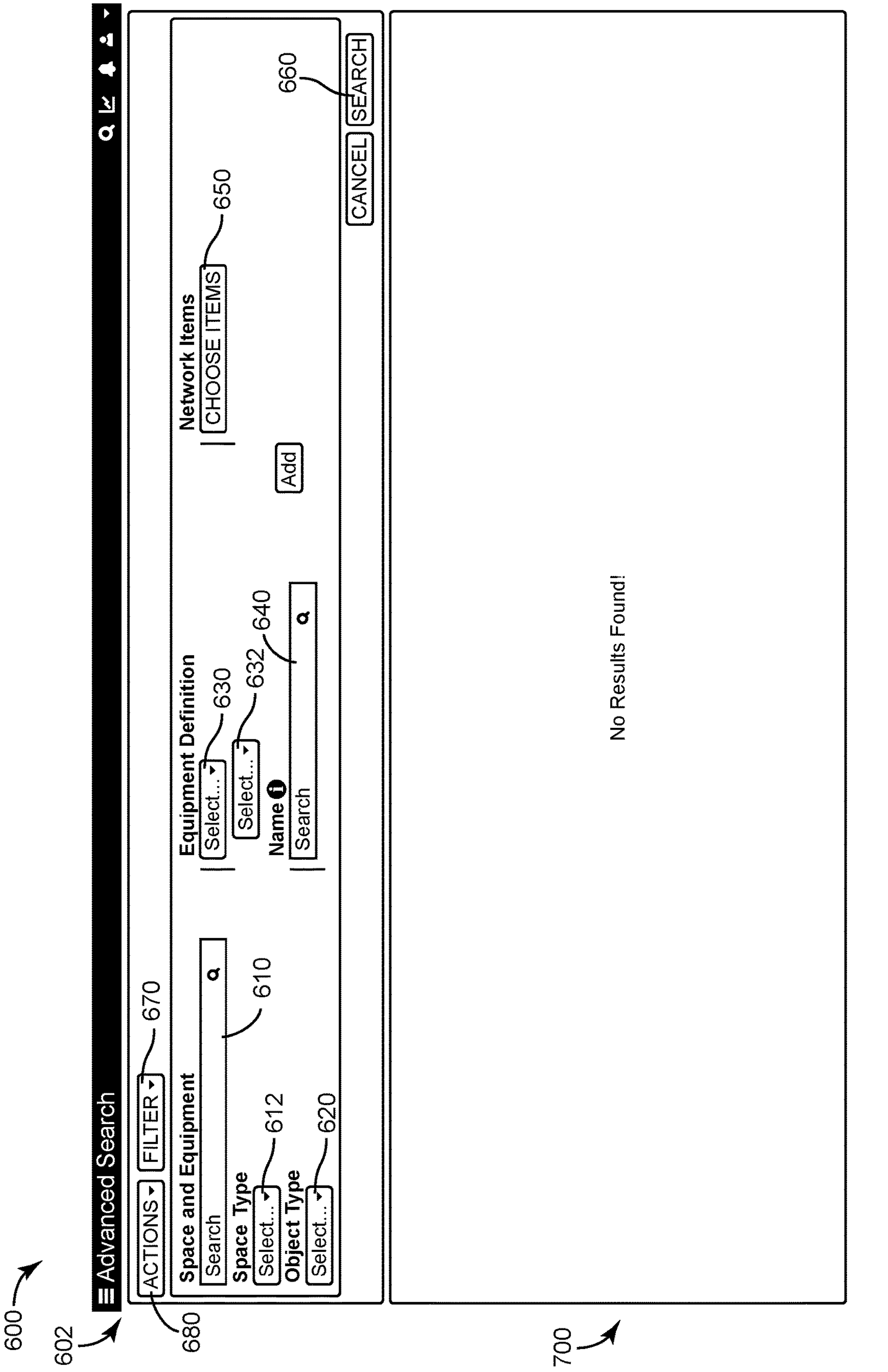
FIG. 6 is an illustration of a search graphical user interface (GUI) provided by the global search and control system of FIG. 5 having a filter area and a results area, according to some embodiments.

Search module 512 may be configured to perform a search request of an operator based on filter criteria inputted by the operator and/or an authorization level of the operator. Search module 512 may perform the search by accessing the information received and/or stored by data module 510 and/or by communicating directly with building network 530 to receive the requested information. Referring to FIGS. 6 and 7, search module 512 may provide a search GUI 600 on user I/O device 540 having a filter section 602 and a results section 700. Filter section 602 is configured to facilitate an operator with inputting the filter criteria for the search request. As shown in FIGS. 6, filter section 602 of search GUI 600 includes various fillable, selectable, and/or drop-down dialog boxes and buttons such as a space and equipment box 610, a space type button 612, an object type button 620, an equipment definition button 630, a name button 632, a name box 640, a network items button 650, a search button 660, and a filter button 670.

Space and equipment box 610 may facilitate an operator in entering a name of a space and/or a name of equipment that information/data is desired (e.g., if know by the operator, etc.). In some embodiments, the space and equipment box 610 provides a drop down menu of spaces that are associated with the global search and control system 500 (e.g., Building A, Building B, Floor 1, Floor 2, Floor 3, etc.). One or more of the spaces may be selectable from the drop down menu. Search module 512 may be configured to return information/data regarding all of the points associated with the space and/or equipment. Space type button 612 may facilitate an operator in selecting one or more types of subspaces within the space selected via the space and equipment box 610. By way of example, search module 512 may subfilter the rooms, subspaces, etc. within one or more selected spaces into a drop-down list for selection via the space type button 612. For example, an operator may select Building "A" and/or Floor 1 of a hospital via space and equipment box 610. Search module 512 may retrieve all spaces associated with Building A and/or Floor 1, identify the various types of spaces (e.g., offices, operating rooms, labs, waiting rooms, conference rooms, bathrooms, hallways, closets, etc.), and provide a list of the types of spaces through space type button 612 for optional user selection.

Object type button 620 may facilitate an operator in selecting one or more object types from a selectable drop down menu. The object types may be software objects that represent devices or points. The object types may include analog, binary, engines, meter, field devices, alarm extensions, trend extensions, etc. Search module 512 may be configured to return information/data regarding the selected object type(s).

Equipment definition button 630 may facilitate an operator in selecting one or more equipment definitions from a selectable drop down menu. By way of example, the equipment definition may include specific types of devices (e.g., air handling units (AHUs), variable air volume (VAV) controllers, etc.) and/or specific devices (e.g., AHU 1, AHU 2, etc.). In some embodiments, the equipment definitions provided through equipment definition button 630 are prefiltered by search module 512 based on the selections made using space and equipment box 610 and/or space type button 612. Search module 512 may be configured to return information/data regarding all of the points associated with the selected equipment definition(s). Name button 632 may facilitate an operator in selecting one or more names for points identified based on the equipment definition(s) selected via the equipment definition button 630. By way of example, search module 512 may subfilter the points associated with the selected equipment definition(s) based on the name of each of the points. The operator may then select one or more names for the points that the user wants data to be returned for.

Name box 640 may facilitate an operator in entering a name of a specific point of equipment that information/data is desired (e.g., if know by the operator, etc.). In some embodiments, search module 512 is configured to provide a selectable drop down menu including all of the points associated with the selected equipment definition(s) (e.g., such that the operator does not need to know the specific point name, for ease of use, etc.). Search module 512 may be configured to return information/data regarding all of the points entered and/or selected via name box 640. Network items button 650 may facilitate an operator with selecting any items connected to building network 530 from a building network tree. Search module 512 may be configured to return information/data regarding the selected items from the building network tree.

In some embodiments, search module 512 is configured to automatically populate one or more of the fields or boxes in search GUI 600 with data pertaining to a user selected item. The automatic population can be initiated from any of the user interfaces or widgets used to present information to a user. For example, a user can view all of the equipment serving a space and all the energy meters associated with a space via an "equipment serving space" (ESS) widget (e.g., VAV->AHU->Central Plants). When viewing the ESS widget, the user can select an item of equipment, a meter, or other data in the widget. In response to the user selecting an item (and clicking a link to automatically populate search GUI 600), search module 512 can automatically populate data associated with the selected equipment, meter, or other data in advanced search GUI 600. For example, assume a user wants to generate a report for an entire building or floor. The user can simply select that building or floor via a filter and click an option (e.g., a link, a button, a drop-down menu, etc.) to create a report.

Advantageously, the automatic population feature may make the searching and reporting features described herein more discoverable as the user is entrenched in daily operational workflows. By creating quick links to populate search GUI 600, the user can take advantage of reports, bulk commands, and modifications easily from any of the widgets used to present information to a user without requiring all of the data to be manually entered or selected via search GUI 600. This feature may reduce time searching for information and allows the user to quickly generate a report for a selected item (e.g., a space, a device of equipment, etc.). Reports can be created across a space (e.g., building, floor, campus, room, etc.) with minimal number of clicks.

Search button 660 may facilitate an operator with initiating a search based on the filter criteria entered by the operator via space and equipment box 610, space type button 612, object type button 620, equipment definition button 630, name button 632, name box 640, and/or network items button 650. Search module 512 may be configured to perform the requested search to return information/data for one or more items based on the filter criteria entered through filter section 602 of search GUI 600 and/or the authorization level of the operator. By way of example, search module 512 may only provide search results that are returned based on the filter criteria that the operator has permission to access. For example, the authorization of the operator may be based on (i) space authorization such that an operator without authorization to a space does not receive search results related to equipment associated with the space, (ii) equipment authorization such that an operator with authorization to a space, but not some of the equipment within the space, only receives search results for the equipment within the space he or she is authorized for, and/or (iii) object authorization such that an operator with authorization to a space and equipment within the space, but not some of the objects associated with the equipment, only receives search results for the objects of the equipment within the space he or she is authorized for. Search module 512 may therefore be configured to selectively pre-filter search results based on the authorization or permission level of an operator such that results the operator is not authorized to see are not returned to users without such a permission or clearance level.

As shown in FIG. 7, results section 700 of the search GUI 600 includes a header row 702 and results rows 704. Header row 702 includes a plurality of headers associated with a selection column 710, a name column 720, an item reference column 730, a value column 740, a units column 750, a status column 760, and a space(s)/equipment column 770. Search module 512 is configured to return a set of search results having a quantity of search results based on the filter criteria and/or the authorization level of the operator for display in results rows 704 including information associated with each of the headers of columns 710-770. If search module 512 is unable to return any search results based on the filter criteria and/or the authorization level of the operator, search module 512 may be configured to display a notification on search GUI 600 indicating that the filter criteria needs to be refined. The operator may then enter new or revised filter criteria via filter section 602. When results are returned by search module 512, results rows 704 may be sorted by selecting one of the headers of columns 710-770 (e.g., selecting the header of name column 720 will sort the results rows alphabetically by name, etc.).

According to an exemplary embodiment, search module 512 is configured dynamically update the set of search results in results section 700 based on the quantity of results rows 704. By way of example, search module 512 may be configured to determine whether the quantity of results rows 704 is greater than a first threshold. In one embodiment, the first threshold is 200 results rows 704. In other embodiments, the first threshold is greater than or less than 200 results rows 704 (e.g., 100, 300, 500, 800, 1000, etc. results rows 704). Search module 512 may be configured to dynamically update results rows 704 in real time within the results section 700 in response to the quantity of results rows 704 being less than the first threshold. Search module 512 may be configured to determine whether the quantity of results rows 704 is greater than a second threshold in response to the quantity of results rows 704 being greater than the first threshold. In one embodiment, the second threshold is 1000 results rows 704. In other embodiments, the second threshold is greater than or less than 1000 results rows 704 (e.g., 500, 750, 800, 1200, 2000, 3000, etc. results rows 704). Search module 512 may be configured to display a notification in search GUI 600 indicating results rows 704 are not being dynamically updated in response to the quantity of results rows 704 being greater than the first threshold, but less than the second threshold. Search module 512 may be configured to display a notification in search GUI 600 indicating that the quantity of results rows 704 exceeds a maximum number of search results and that the filter criteria needs to be refined in response to the quantity of results rows 704 being greater than the second threshold. The operator may then enter new or revised filter criteria via filter section 602.

As shown in FIG. 7, selection column 710 includes a plurality of selectable boxes 712. The plurality of selectable boxes 712 may facilitate an operator with selecting specific rows of items presented within results section 700. Name column 720 provides the names of each item presented within results section 700. As shown in FIG. 7, item reference column 730 includes a selectable link 732 for each of the items presented in the results section 700. According to an exemplary embodiment, each selectable link 732 of item reference column 730 is associated with a network page for a respective item presented in results section 700. Search module 512 may thereby be configured to redirect an operator from search GUI 600 to the network page of an item (e.g., containing various information regarding the item, etc.) associated with a respective selectable link 732 in response to the selection of the respective selectable link 732.

As shown in FIG. 7, value column 740 includes a selectable link 742 for each of the items presented in the results section 700. According to an exemplary embodiment, each selectable link 742 of value column 740 provides (e.g., displays, etc.) the current set point or mode the associated item is operating at or in. By way of example, the current set point or mode may include active, inactive, unknown, a current set point value (e.g., a speed set point value, a temperature set point value, a pressure set point value, etc.), and the like. Command module 514 may be configured to provide a single command modal window over search GUI 600 in response to a selection of a respective selectable link 742 by an operator from search GUI 600. The operator may thereby be able to provide a single command to the item associated with the respective selectable link 742 to change the current set point or mode of operation of the item. As shown in FIG. 7, the status column 760 displays the current status for each items presented in the results section. The current status may include normal, online, offline, standby, derate, fault, etc.

As shown in FIG. 7, space(s)/equipment column 770 includes a selectable link 772 for each of the items presented in the results section 700. According to an exemplary embodiment, each selectable link 772 of space(s)/equipment column 770 is associated with a space or equipment page for each of the spaces and/or equipment the respective item is associated with. Selectable links 772 may be associated with multiple spaces and/or equipment for a respective item. By way of example, when a selectable link 772 is associated with more than one space and/or equipment (e.g., two, three, four, etc.), search module 512 may be configured display a pop-up window with direct links to each of the spaces and/or equipment pages associated with the respective item in response to an operator hovering over or selecting the associated selectable link 772. If only one space or equipment is associated with the respective item, the associated selectable link 772 may be a direct link to the associated space page or equipment page.

Figure 8:
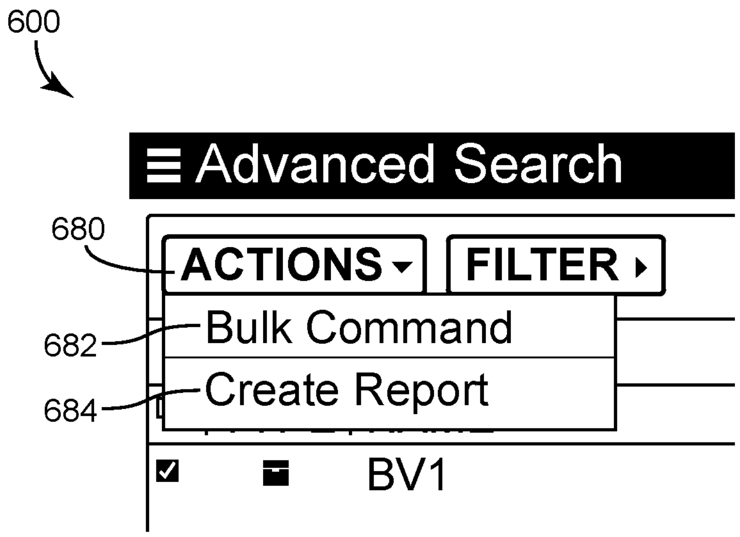
FIG. 8 is an illustration of a drop down actions menu of the search GUI of FIG. 6, according to some embodiments.

As shown in FIGS. 6-8, filter section 602 of search GUI 600 includes a filter button 670 and an actions button 680. According to an exemplary embodiment, the filter button 670 facilitates expanding filter section 602 (e.g., as shown in FIG. 6, etc.) and retracting filter section 602 (e.g., as shown in FIG. 7, etc.). As shown in FIG. 8, selecting actions button 680 causes a drop down menu to be provided including a bulk command button 682 and a create report button 684. According to an exemplary embodiment, a bulk command may be provided to a plurality (e.g., two or more, etc.) of the items of result rows 704 via bulk command button 682 and/or a report may be generated for a plurality of the items of result rows 704 via create report button 684.

Figure 9:
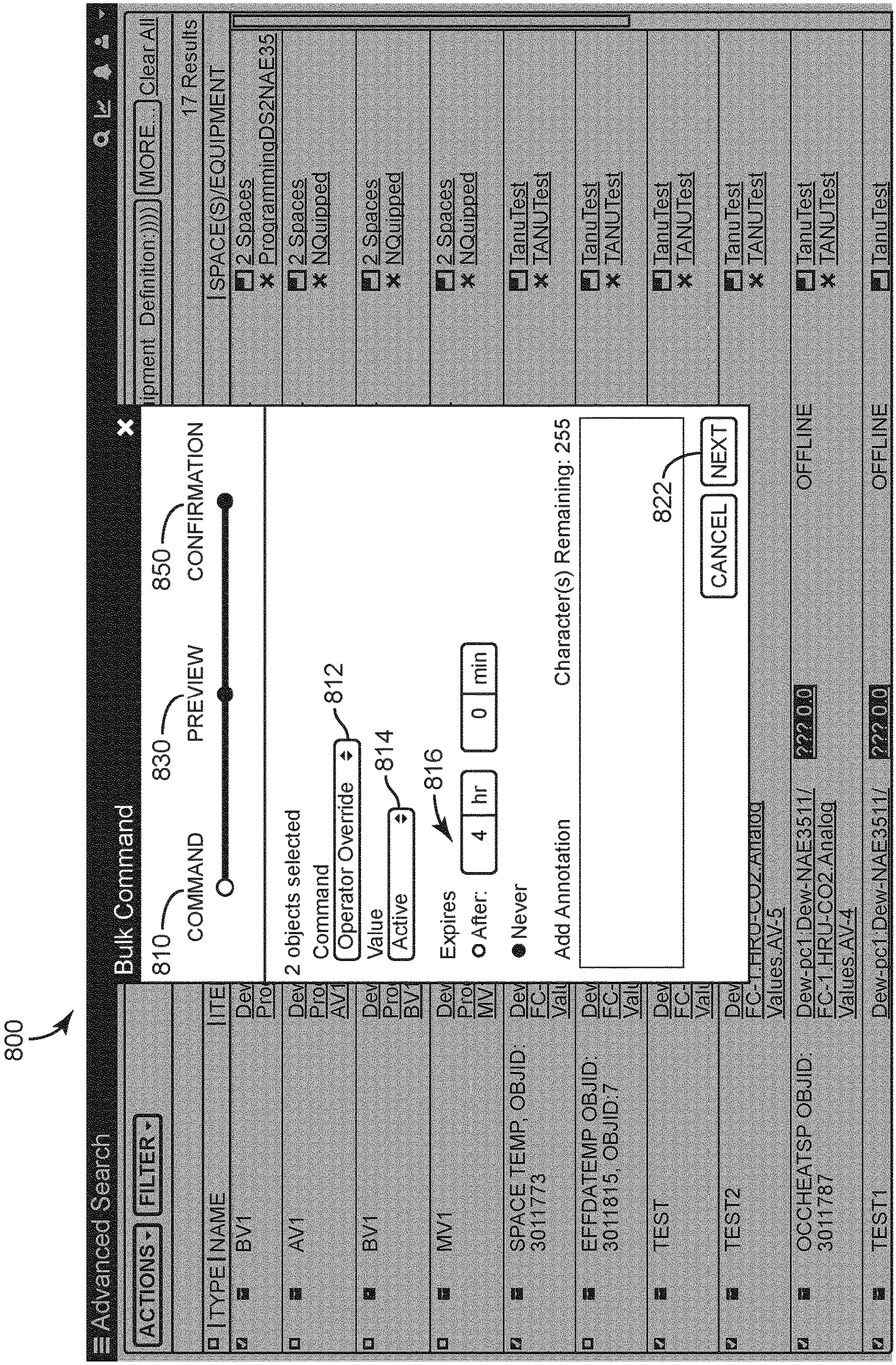
FIG. 9 is an illustration of a bulk command modal window provided over the search GUI of FIG. 6, according to some embodiments.

Command module 514 may be configured to provide a command to one or more items returned by search module 512 within results section 700 based on various user inputs. By way of example, command module 514 may be configured to provide a command to a single item based on an operator selecting a respective selectable link 742 of value column 740, as described above. By way of another example, command module 514 may be configured to provide a bulk command to one or more items returned by search module 512 within results section 700 based on an operator selecting one or more of results rows 704 and bulk command button 682. Referring now to FIG. 9, command module 514 may provide a bulk command modal window 800 (e.g., over search GUI 600, etc.) in response to an operator selecting bulk command button 682. Bulk command modal window 800 is configured to facilitate an operator with inputting command criteria for a bulk command to be provided to one or more of the items associated with the selected results rows 704.

As shown in FIG. 9, command module 514 is configured to provide a command interface 810 on bulk command modal window 800. The command interface 810 includes various fillable, selectable, and/or drop-down dialog boxes and buttons such as a command button 812, a value button 814, and an expiration section 816. The command button 812 may facilitate the operator with inputting and/or selecting an available command (e.g., command capable of being provided to the selected items, etc.) to provide to one or more of the items associated with the selected results rows 704. The value button 814 may facilitate the operator with providing a value (e.g., active, inactive, an operating parameter, etc.) for the command to one or more of the items associated with the selected results rows 704. The expiration section 816 may facilitate the operator with providing a duration for the command to remain in effect before expiring.

Command module 514 is configured receive command criteria (e.g., via command button 812, value button 814, expiration section 816, etc.) regarding a bulk command to provide to the one or more items of the selected results rows 704 that are capable of receiving the chosen bulk command. According to an exemplary embodiment, command module 514 has a smart command/detect capability such that command module 514 may detect and identify whether a bulk command can be provided to each of the items associated with the selected results rows 704. By way of example, command module 514 may be configured to recognize class IDs for each of the items of the selected results rows 704 and determine whether the chosen bulk command can be applied to each of the class IDs present in the selected results rows 704. For example, a certain type of command may not be compatible with one or more class IDs. Command module 514 may therefore be configured to return a notification indicating that the chosen bulk command cannot be completed for all of the selected results rows 704 in response to the chosen bulk command not being capable of being applied to all of the represented class IDs.

After receiving the command criteria and the operator pressing next button 822, command module 514 may be configured to provide a preview interface 830 on bulk command modal window 800. Preview interface 830 may provide an indication of the number of items the bulk command will affect (e.g., the items with class IDs compatible with the bulk command, etc.), the command being provided, a table showing the items that will be affected (e.g., object, name, item reference, present value, etc.), etc. Command module 514 may be configured to receive an indication from the operator to proceed with the bulk command (e.g., a next button on the preview interface 830, etc.). Command module 514 may then provide the bulk command to the compatible items associated with the selected results rows 704.

Command module 514 may be further configured to provide a confirmation interface 850 on bulk command modal window 800 in response to the bulk command being provided to the items associated with the selected results rows 704. Confirmation interface 850 may provide various information such as the number of items the bulk command affected, the command that was provided, a table showing successful commands and failed commands, etc. The successful command may be grouped together and the failed commands may be grouped together separately. By way of example, a plurality of air handling units (e.g., two, three, etc.) may have been provided a bulk command by command module 514. Confirmation interface 850 may provide information regarding the value prior to the bulk command (e.g., inactive, etc.), the command that was provided thereto (e.g., operator override, etc.), the value of the command (e.g., active, etc.), and an indication of which of the plurality of air handling units were successfully commanded and which failed.

Figure 17:
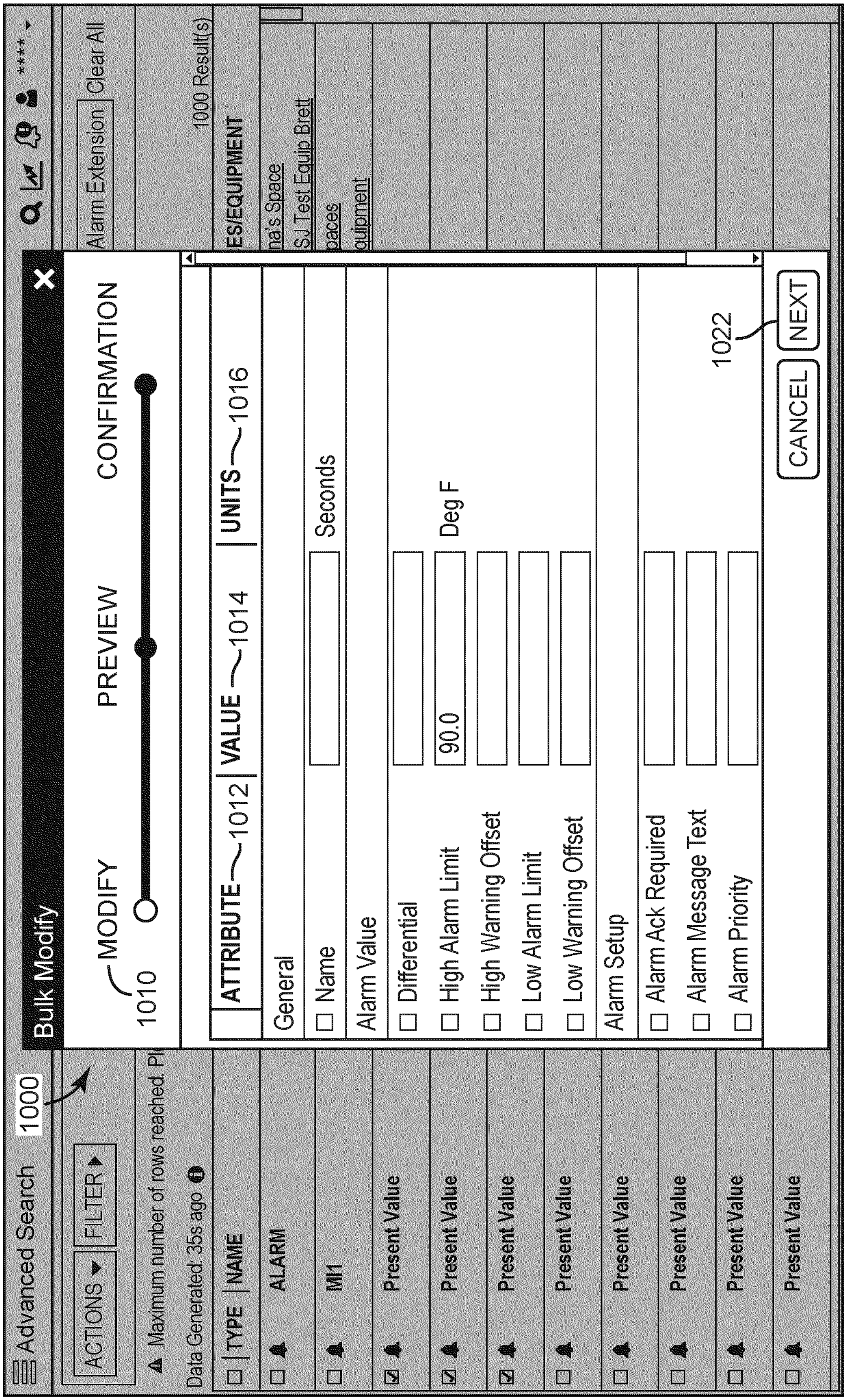
FIG. 17 is an illustration of a bulk command modal window provided over the search GUI of FIG. 6, according to some embodiments.
Figure 18:
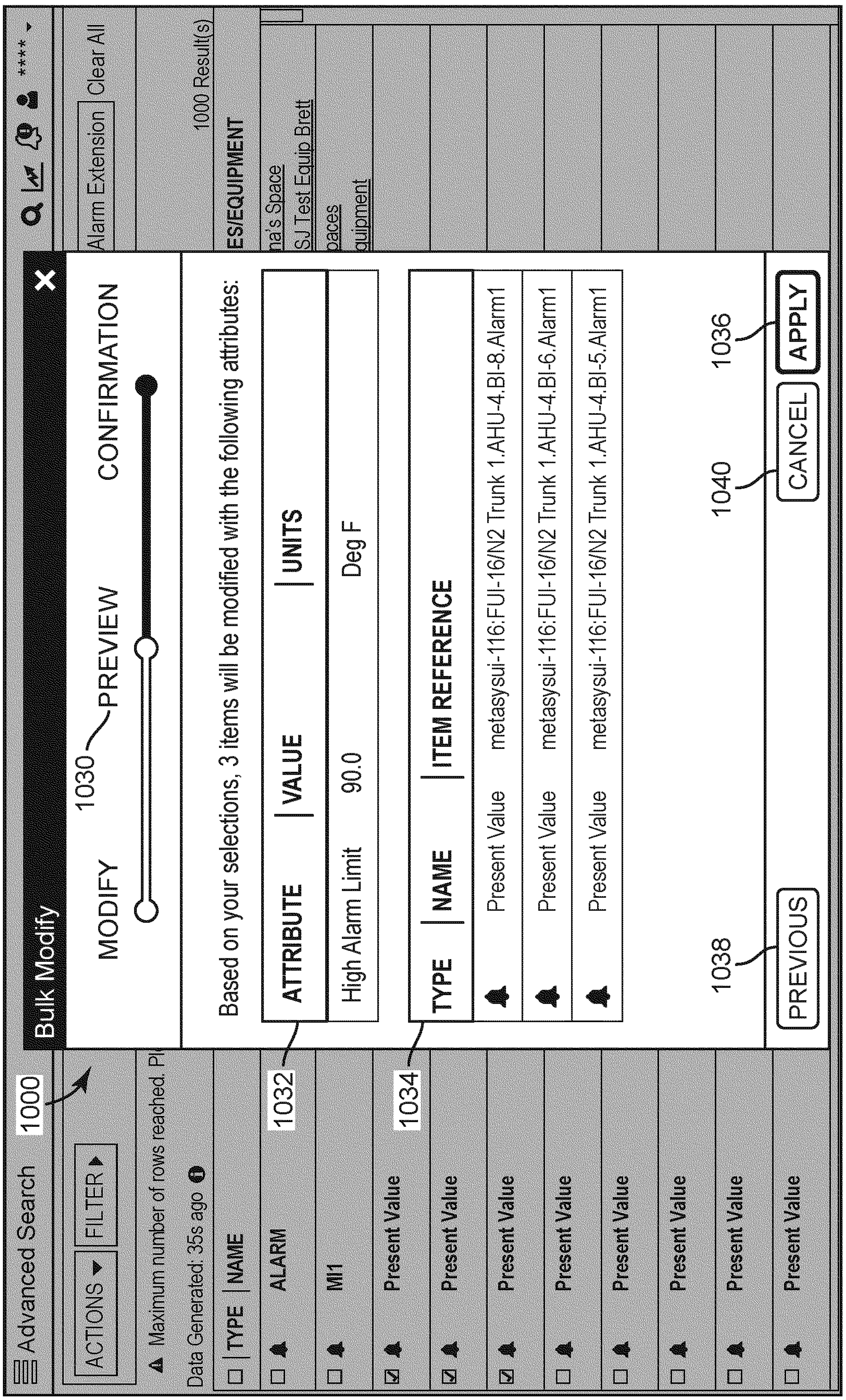
FIG. 18 is an illustration of a preview interface of the bulk command modal window of FIG. 17, according to some embodiments.
Figure 19:
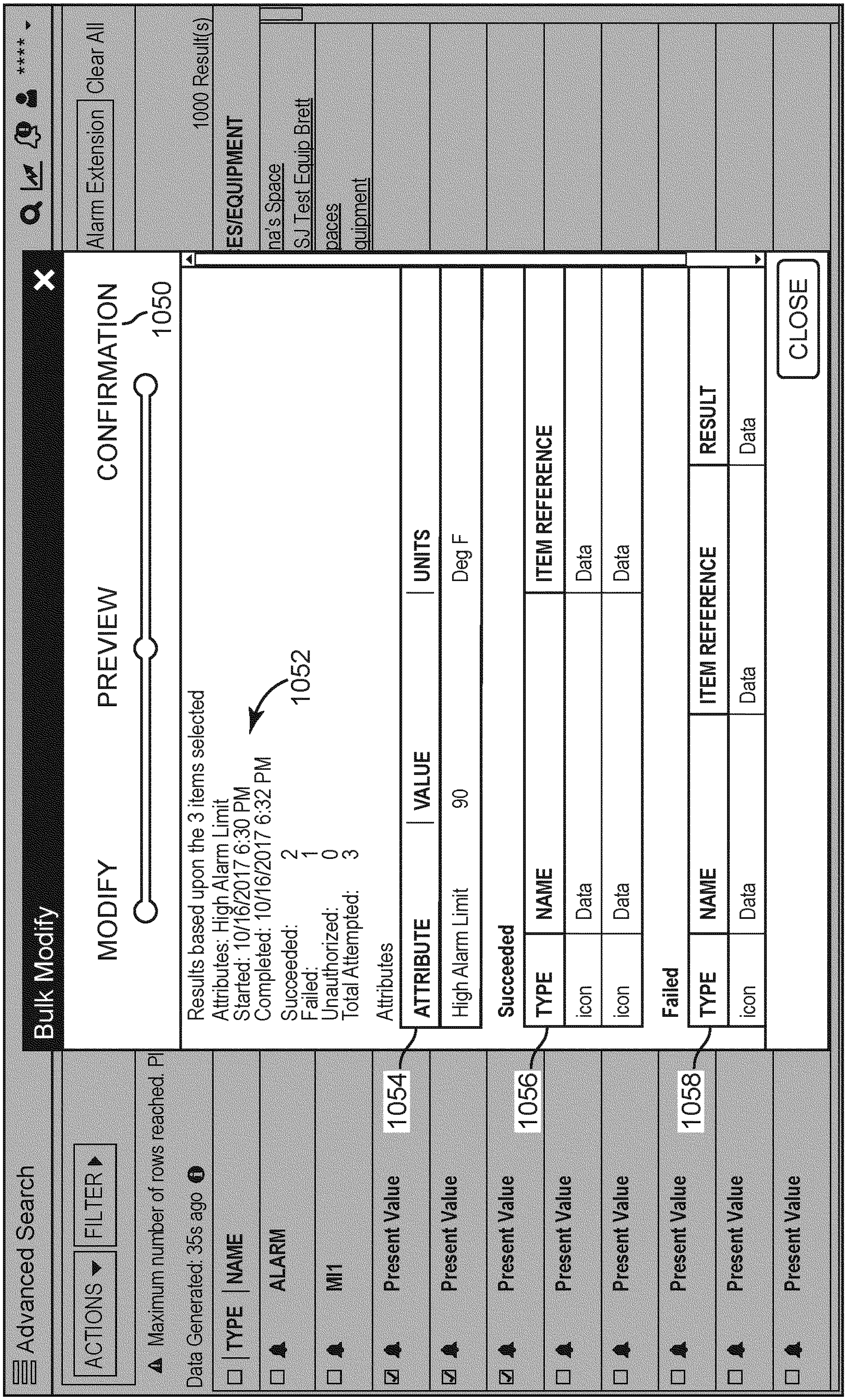
FIG. 19 is an illustration of confirmation interface of the bulk command modal window of FIG. 17, according to some embodiments.

Modification module 516 may be configured to facilitate modifying a plurality of points (e.g., one, two, five, ten, one hundred, etc.) returned by search module 512 within results section 700 based on various user inputs simultaneously. By way of example, modification module 516 may be configured to facilitate changing alarm limits across hundreds of points simultaneously. Referring now to FIGS. 17-19, modification module 516 may provide a bulk modify modal window 1000 (e.g., over search GUI 600, in response to an operator selecting a bulk modify button via the actions button 680, etc.). Bulk modify modal window 1000 is configured to facilitate an operator with inputting modification criteria for a bulk modification to be provided to one or more of the items associated with the selected results rows 704.

As shown in FIG. 17, modification module 516 is configured to provide a modification interface 1010 on bulk modify modal window 1000. The modification interface 1010 includes an attribute column 1012 identifying various attributes of the selected items, a value column 1014 including fillable, selectable, and/or drop-down dialog boxes and buttons that facilitate inputting a value for the attributes in attribute column 1012 that an operator would like to modify, and a units column 1016 identifying the units for the value of the attributes in the value column 1014. The attributes in the attribute column 1012 may include a name, an alarm value, a differential value, a high alarm limit, a high warning offset, a low alarm limit, a low warning offset, alarm setup attributes including whether alarm acknowledgment is required, alarm message text, and alarm priority, and/or still other attributes.

Modification module 516 is configured receive modification criteria (e.g., via value column 1014, etc.) regarding at least one attribute of the one or more items associated with the selected results rows 704 to be modified. After receiving the modification criteria and the operator pressing next button 1022, modification module 516 may be configured to provide a preview interface 1030 on bulk modify modal window 1000. As shown in FIG. 18, preview interface 1030 includes (i) an attribute modification table 1032 that indicates what attributes have been selected to be modified with the associated new value and units thereof and (ii) an items table 1034 that indicates a number of and which items the bulk modification will affect. Modification module 516 may be configured to receive an indication from the operator to proceed with the bulk modification using an apply button 1036 on preview interface 1030. The user can select to (i) make changes to the bulk modification using a previous button 1038 to return to modification interface 1010 or (ii) cancel the bulk modification by selecting a cancel button 1040. In response to the user selecting apply button 1036, modification module 516 is configured to perform a modification on the at least one attribute of the one or more items associated with the selected results rows 704. The modification may cause the at least one attribute of the one or more items to update to the new value.

As shown in FIG. 19, modification module 516 is further configured to provide a confirmation interface 1050 on bulk modify modal window 1000 in response to the bulk modification being provided to the items associated with the selected results rows 704. Confirmation interface 1050 includes a modification recap section 1052, an attribute modification table 1054, a success table 1056, and a failure table 1058 that cooperatively provide various information such as the number of items the bulk modification affected, the attributes that were modified, successful modifications, failed modifications, etc. The successful modifications may be grouped together and the failed modifications may be grouped together separately as shown in success table 1056 and failure table 1058, or grouped together and otherwise distinguished.

As an example, on a hot and sunny day, a building operator (e.g., for a large site, etc.) may want to update a temperature set point for an entire site. As there could be numerous items of equipment across the site that need to adjusted to update the temperature set point across the entire site, the building operator can search all the zone temperatures across the site. The building operator may then select all of the equipment responsible for the zone temperatures across the site and modify/update the set point for all of the equipment in one pass.

Figure 10:
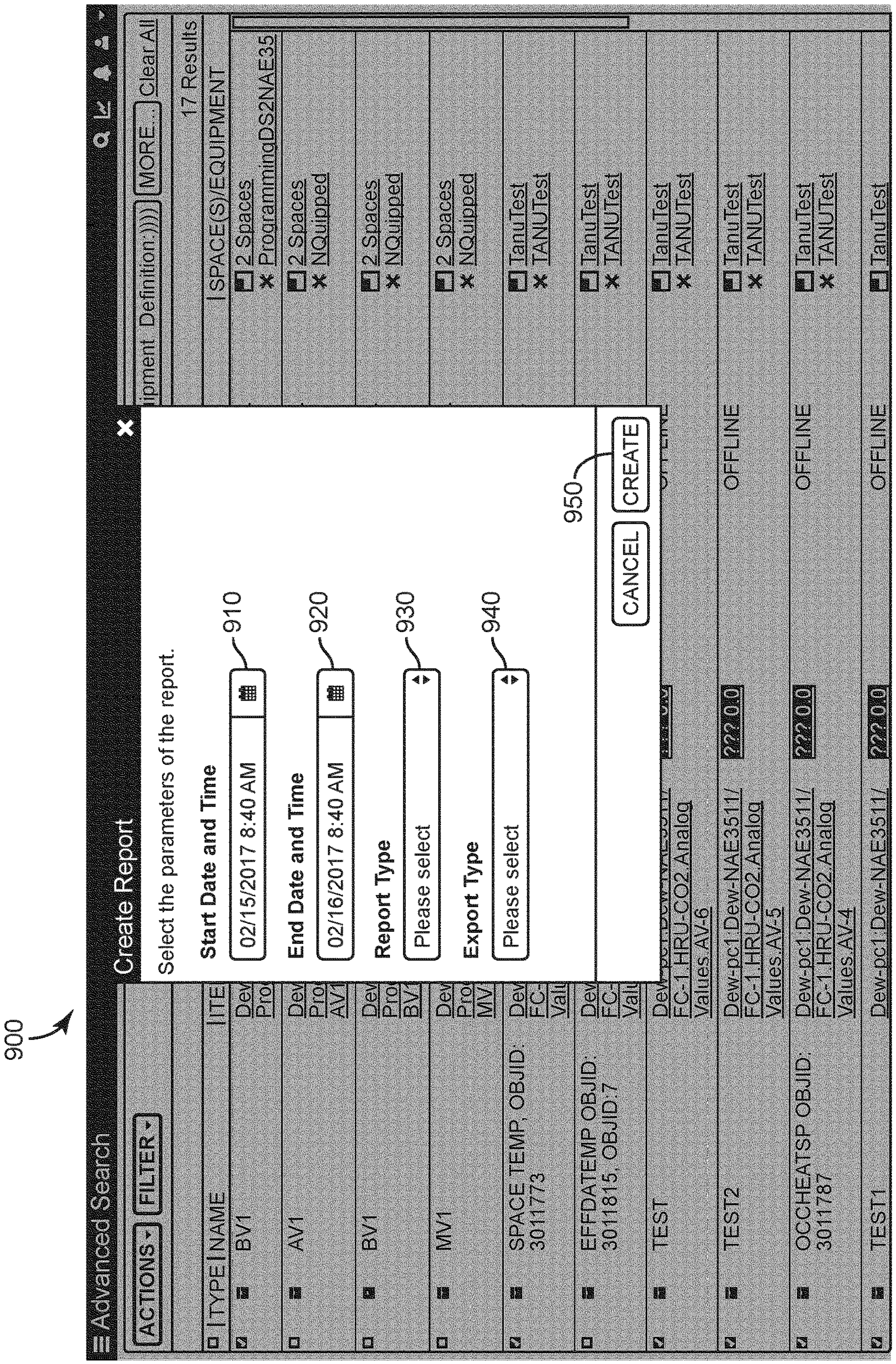
FIG. 10 is an illustration of a report creator modal window provided over the search GUI of FIG. 6, according to some embodiments.

Report module 518 may be configured to generate a report for one or more items returned by search module 512 within results section 700 based on various user inputs. Referring now to FIG. 10, report module 518 may provide a report modal window 900 (e.g., over search GUI 600, etc.) in response to an operator selecting create report button 684. Report modal window 900 is configured to facilitate an operator with inputting report criteria for a report to be generated regarding one or more of the items associated with the selected results rows 704.

As shown in FIG. 10, report modal window 900 includes various fillable, selectable, and/or drop-down dialog boxes and buttons such as a start date and time box 910, an end date and time box 920, a report type box 930, and an export type box 940. The start date and time box 910 may facilitate the operator with inputting a start date and/or a start time at which report module 518 should gather data from (e.g., from the data module 510, etc.) for the requested report. The end date and time box 920 may facilitate the operator with inputting an end date and/or an end time at which report module 518 should gather data up to (e.g., from the data module 510, etc.) for the requested report. The report type box 930 may facilitate the operator with selecting a type of report that is desired from a drop-down menu. The type of report may include an activity report, an alarm report, an audit report, and/or a trend report. The export type box 940 may facilitate the operator with selecting a type of export file that is desired for the report from a drop-down menu. The type of export file may include a csv file, a pdf file, an excel file, a text file, and/or still another type of suitable file format.

The activity report may present activity information regarding alarms and audits for items selected from results section 700 of search GUI 600 within the selected time frame provided through start date and time box 910 and end date and time box 920. The alarm report may present alarm information regarding alarms for items selected from results section 700 of search GUI 600 within the selected time frame provided through start date and time box 910 and end date and time box 920. The audit report may present audit information for items selected from results section 700 of search GUI 600 within the selected time frame provided through start date and time box 910 and end date and time box 920. The trend report may present trend information including time series data for the selected items.

According to an exemplary embodiment, report module 518 is configured to select a specific granularity to present the data for the selected items based on the selected time frame. The time series data may thereby be presented in various different levels of granularity based on the duration of time selected via start date and time box 910 and end date and time box 920. By way of example, if the duration of time is less than a first threshold (e.g., seven days or less, etc.), report module 518 may be configured to display raw data. By way of another example, if the duration of time is greater than the first threshold, but less than a second threshold (e.g., fifty days or less, etc.), report module 518 may be configured to display data that is aggregated on a daily basis. By way of yet another example, if the duration of time is greater than the second threshold (e.g., more than fifty days, etc.), report module 518 may be configured to display data that is aggregated on a monthly basis.

In some embodiments, report module 518 is configured to aggregate data in a report according to the equipment associated with the data. For example, report module 518 can aggregate multiple alarms for a single device or group multiple alarms for a single device to be shown adjacent to each other in the report. Similarly, report module 518 can aggregate or group audits in an audit report and/or trends in a trend report by the corresponding device or devices of equipment.

Report module 518 may thereby be configured to generate a report based on the report criteria received via start date and time box 910, end date and time box 920, report type box 930, and export type box 940 in response to an operator selecting the create report button 684. In some embodiments, report module 518 facilitates downloading the generated report onto an end user device (e.g., laptop, computer, tablet, smartphone, etc.) in the format chosen in export type box 940. The report may thereafter be saved, viewed, manipulated, printed, etc. on the end user device. In some embodiments, report module 518 is configured to facilitate saving the report for future use.

Figure 20:
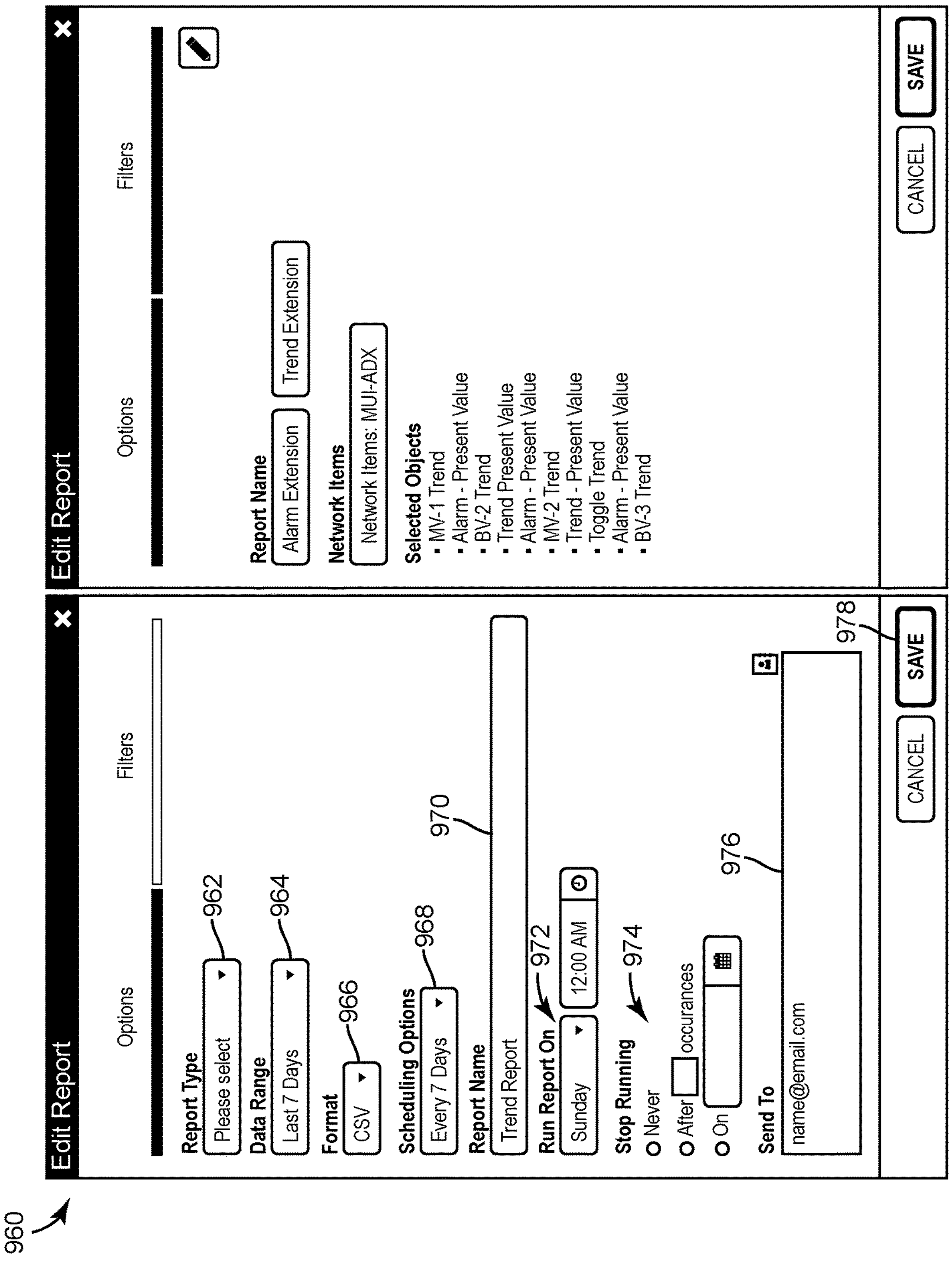
FIG. 20 is an illustration of a future report generation window, according to some embodiments.

In some embodiments, report module 518 is configured to facilitate scheduling a report for future generation (e.g., periodic report generation, etc.). Referring now to FIG. 20, report module 518 may provide a report editor window 960. Report editor window 960 is configured to facilitate an operator with setting up and scheduling a report for future and/or periodic generation. As shown in FIG. 20, report editor window 960 includes a report type box 962, a date range box 964, a format box 966, a scheduling box 968, a report name box 970, a run report on box 972, a stop running box 974, and a send to box 976. The report type box 962 may facilitate the operator with selecting a type of report that is desired from a drop-down menu (e.g., an activity report, an alarm report, an audit report, a trend report, etc.). The date range box 964 may facilitate the operator with selecting a date range for which data for the report should be gathered (e.g., prior day, prior week, prior month, prior quarter, prior year, all history, etc.). The format box 966 may facilitate the operator with selecting a format type of export file that is desired for the report from a drop-down menu (e.g., a csv file, a pdf file, an excel file, a text file, etc.). The scheduling box 968 may facilitate an operator in scheduling the report to be generated on a periodic basis (e.g., weekly, bi-weekly, monthly, quarterly, etc.) from a drop-down menu. The report name box 970 may facilitate an operator in providing a name for the report such that the report may be easily identifiable. The run report on box 972 may facilitate an operator is selecting on which day of the week and/or time the report is to be generated. The stop running box 974 may facilitate an operator in identifying how many times the report should be automatically generated (e.g., once, twice, ten times, infinite, etc.) and/or a future date on which the automatic generation should stop (e.g., Sep. 1, 2020; Dec. 31, 2017; etc.). The send to box 976 may facilitate an operator in identifying who the automatically generated future report(s) should be sent to (e.g., via email, etc.). A save button 978 may facilitate an operator in saving the parameters defined via boxes 962-976 for the future report generation.

As an example, global search and control system 500 may be implemented in a hospital. An operator may be able to search by spaces and/or equipment (e.g., via space and equipment box 610 of search GUI 600, etc.) for an emergency room within the hospital. The operator may further narrow the search to find pressure and temperature measurements within the emergency room over time. Such narrowing may be completed by selecting a pressure monitor and/or temperature sensor from within the drop down menu presented when selecting equipment definition button 630, entering the name(s) thereof into name box 640, and/or selecting the corresponding devices from the building network tree presented when selecting network items button 650. The operator may then proceed to generate a trend report for the pressures and/or temperatures within the emergency room for a given time period by selecting the create report button 684 and filling report criteria into report modal window 900. Global search and control system 500 therefore provides users with the capability of generating reports for any items connected to building network 530 (e.g., any buildings, spaces, systems, equipment, devices, points, etc. connected to the building network 530 within a few steps).

As another example, global search and control system 500 may facilitate validating changes to equipment connected to building network 530. By way of example, an operator may select a building (e.g., via space and equipment box 610 of search GUI 600, etc.). Thereafter, the operator may select all air handling units (e.g., via equipment definition button 630, etc.) and search set points for the air handling units. Global search and control system 500 may return all the set points for all the air handling units of the selected building. Thereafter, the operator can bulk select any number of the set points and have an activity/audit report generated by selecting the create report button 684 and filling report criteria into report modal window 900. The activity/audit report may provide information such as who has made changes to the set points of the air handling units over time.

Figure 11A:
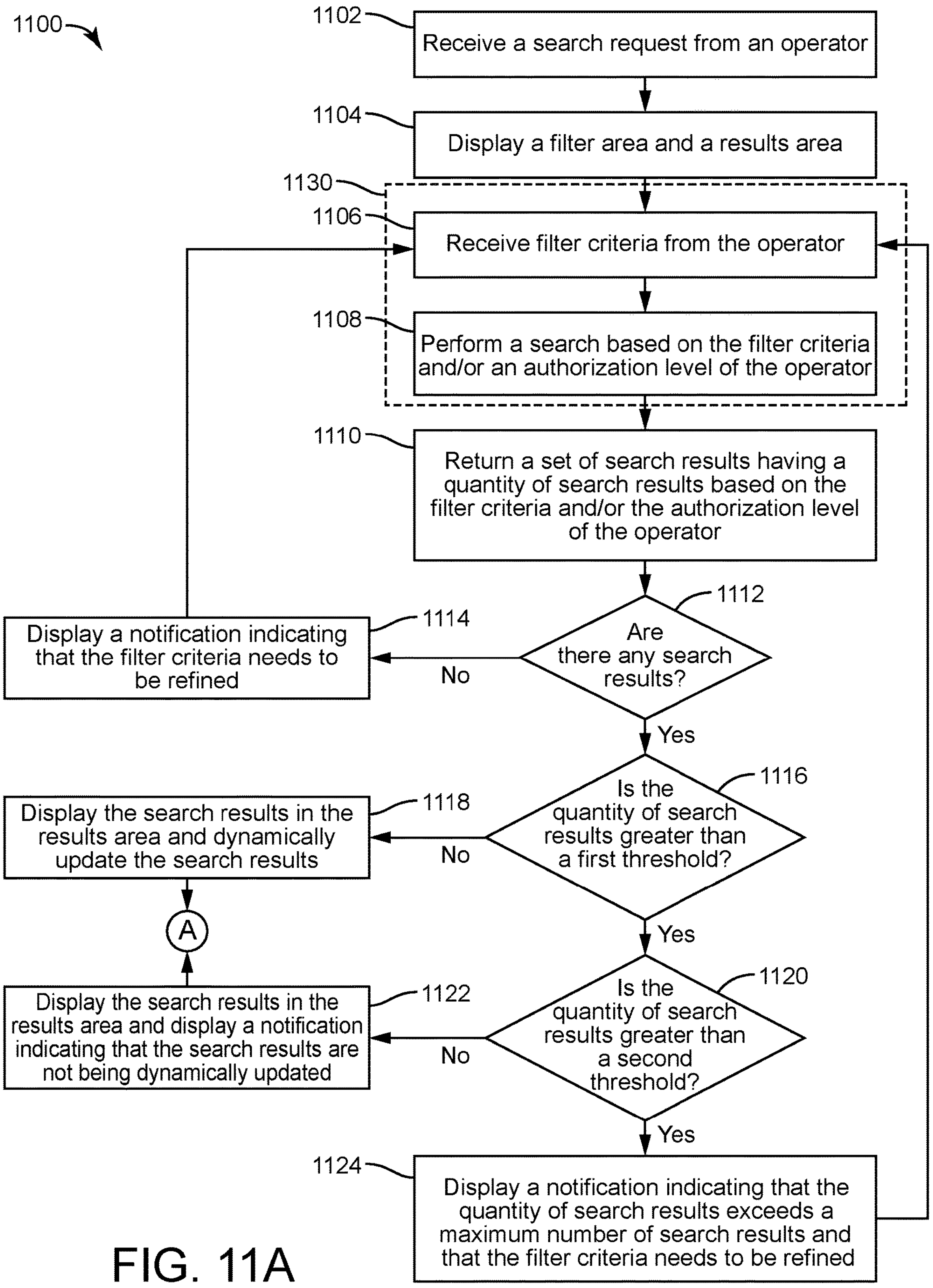
FIGS. 11A and 11B provide a flow diagram of a method for performing a global search, according to some embodiments.
Figure 11B:
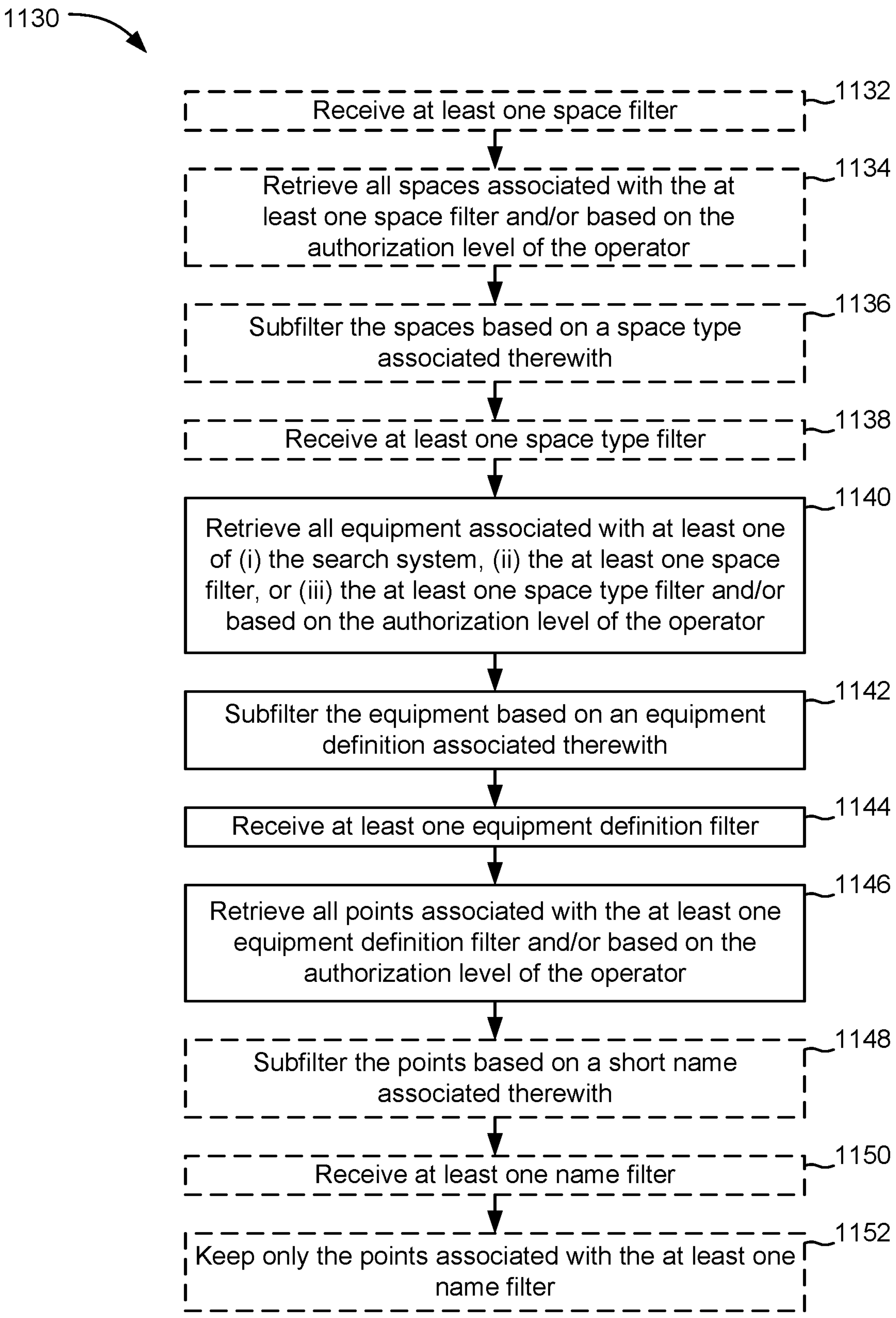

Referring to FIGS. 11A and 11B, a method 1100 for performing a global search is shown according to an exemplary embodiment. According to an exemplary embodiment, method 1100 is performed by global search and control system 500. Method 1100 may therefore be described in regards to global search and control system 500. At step 1102, a search system (e.g., global search and control system 500, etc.) is configured to receive a search request from an operator (e.g., while on a site management portal, etc.) via a user device (e.g., user I/O device 540, etc.). At step 1104, the search system is configured to display a GUI (e.g., search GUI 600, etc.) having a filter area (e.g., filter section 602, etc.) and a results area (e.g., the results section 700, etc.). At step 1106, the search system is configured to receive filter criteria from the operator. The filter criteria may include a space filter, a space type filter, an equipment filter, an object type filter, an equipment definition filter, a point name filter, or a network item filter, etc.

At step 1108, the search system is configured to perform a search based on the filter criteria and/or an authorization level of the operator. By way of example, the search system may only return search results that the operator has permission to access. For example, the authorization of the operator may be based on (i) space authorization such that an operator without authorization to a space does not receive search results related to equipment associated with the space, (ii) equipment authorization such that an operator with authorization to a space, but not some of the equipment within the space, only receives search results for the equipment within the space he or she is authorized for, and/or (iii) object authorization such that an operator with authorization to a space and equipment within the space, but not some of the objects associated with the equipment, only receives search results for the objects of the equipment within the space he or she is authorized for. The search system may therefore be configured to selectively pre-filter search results based on the authorization or permission level of an operator such that results the operator is not authorized to see are not returned to users without such a permission or clearance level.

At step 1110, the search system is configured to return a set of search results having a quantity of search results based on the filter criteria and/or the authorization level of the operator. At step 1112, the search system is configured to determine whether there are any search results based on the filter criteria and/or the authorization level of the operator. If there are no search results, the search system is configured to display a notification indicating that the filter criteria needs to be refined (step 1114). The operator may then enter new or revised filter criteria and the search system may repeat steps 1106-1112.

At step 1116, the search system is configured to determine whether the quantity of search results is greater than a first threshold (e.g., 200, 300, 500, 800, 1000, etc. search results) in response to there being at least one result. At step 1118, the search system is configured to display the search results in the results area and dynamically update the search results in real time in response to the quantity of search results being less than the first threshold. At step 1120, the search system is configured to determine whether the quantity of search results is greater than a second threshold (e.g., 500, 750, 800, 1000, 1200, 2000, 3000, etc. search results) in response to the quantity of search results being greater than the first threshold. At step 1122, the search system is configured to display the search results in the results area and display a notification indicating the search results are not being dynamically updated in response to the quantity of search results being greater than the first threshold, but less than the second threshold. At step 1124, the search system is configured to display a notification indicating that the quantity of search results exceeds a maximum number of search results and that the filter criteria needs to be refined in response to the quantity of search results being greater than the second threshold. The operator may then enter new or revised filter criteria and the search system may repeat steps 1106-1124, as necessary.

A more detailed description of step 1106 and step 1108 is provided in sub-method 1130 shown in FIG. 11B, according to one embodiment. It should be understood that step 1106 and step 1108 may be performed in any suitable way described with regards to FIG. 6. At step 1132, the search system is configured to receive at least one space filter (e.g., via space and equipment box 610, etc.). At step 1134, the search system is configured to retrieve (e.g., recall, identify, determine, obtain, pull, etc.) all spaces associated with the at least one space filter selected and/or based on an authorization level of the operator. In some embodiments, step 1132 and step 1134 are optional. At step 1136, the search system is configured to subfilter (e.g., group, sort, etc.) the spaces based on a space type associated with each of the spaces retrieved in step 1134. At step 1138, the search system is configured to receive at least one space type filter (e.g., via space type button 612, etc.). In some embodiments, step 1136 and step 1138 are optional (e.g., space types may not populate unless the at least one space filter is entered into space and equipment box 610, etc.).

At step 1140, the search system is configured to retrieve (e.g., recall, identify, determine, obtain, pull, etc.) all equipment associated with at least one of (i) the search system (e.g., if no selections are made via space and equipment box 610 and space type button 612, etc.), (ii) the at least one space filter (e.g., if selections are made via space and equipment box 610, etc.), or (iii) the at least one space type filter (e.g., if selections are made via space type button 612, etc.) and/or based on the authorization level of the operator. At step 1142, the search system is configured to subfilter (e.g., group, sort, etc.) the equipment based on an equipment definition associated with each of the equipment retrieved in step 1140. At step 1144, the search system is configured to receive at least one equipment definition filter (e.g., via equipment definition button 630, etc.). At step 1146, the search system is configured to retrieve (e.g., recall, identify, determine, obtain, pull, etc.) all points associated with the at least one equipment definition filter selected and/or based on the authorization level of the operator.

At step 1148, the search system is configured to subfilter (e.g., group, sort, etc.) the points based on a name associated with each of the points retrieved in step 1146. At step 1150, the search system is configured to receive at least one name filter (e.g., via the name button 632, etc.). At step 1152, the search system is configured to keep only the points associated with the at least one name filter selected. The search system may then proceed to step 1110. In some embodiments, step 1148, step 1150, and step 1152 are optional. In such embodiments, the search system may proceed to step 1110 after step 1146.

Figure 12:
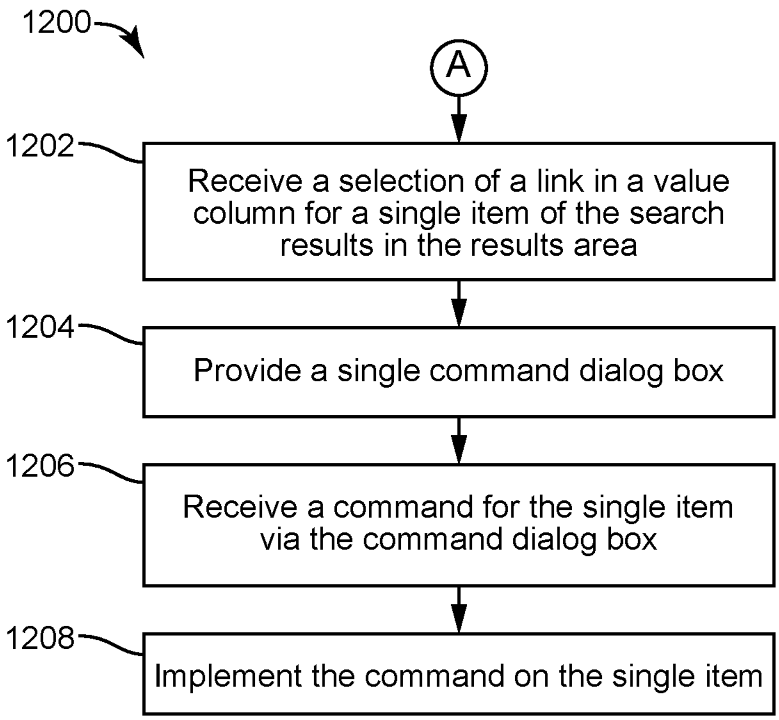
FIG. 12 is a flow diagram of a method for performing a single command on an item from global search results, according to some embodiments.

Referring to FIG. 12, a method 1200 for performing a single command on an item from global search results is shown according to an exemplary embodiment. According to an exemplary embodiment, method 1200 is an extension of method 1100. By way of example, the operator may provide a command to an item of the search results displayed by the search system (e.g., after step 1118, step 1122, etc.). At step 1202, the search system is configured to receive a selection of a link in a value column (e.g., value column 740, etc.) for a single item of the search results in the results area. At step 1204, the search system is configured to provide a single command dialog box (e.g., in the same window as search GUI 600, etc.). At step 1206, the search system is configured to receive a command for the single item from the operator via the command dialog box. At step 1208, the search system is configured to implement the command on the single item.

Figure 13:
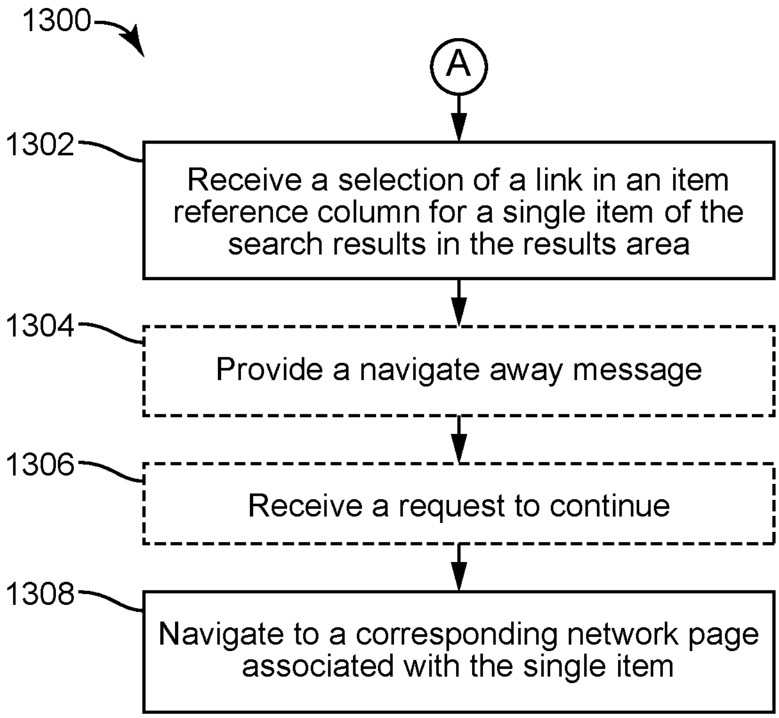
FIG. 13 is a flow diagram of a method for viewing a network page associated with an item from global search results, according to some embodiments.

Referring to FIG. 13, a method 1300 for viewing a network page associated with an item from global search results is shown according to an exemplary embodiment. According to an exemplary embodiment, method 1300 is an extension of method 1100. By way of example, the operator may view the network page of an item in the search results displayed by the search system (e.g., after step 1118, step 1122, etc.). At step 1302, the search system is configured to receive a selection of a link in an item reference column (e.g., item reference column 730, etc.) for a single item of the search results in the results area. At step 1304, the search system is configured to provide a navigate away message indicating that the search system has to navigate away from the current interface (e.g., search GUI 600, etc.) to display the network page associated with the selected link in the item reference column. At step 1306, the search system is configured to receive a request to navigate away (e.g., from search GUI 600, etc.). In some embodiments, the search system does not complete step 1304 and/or step 1306 (e.g., the operator has previously selected to not receive the navigate away message, etc.). At step 1308, the search system is configured to navigate to a corresponding network page associated with the single item.

Figure 14:
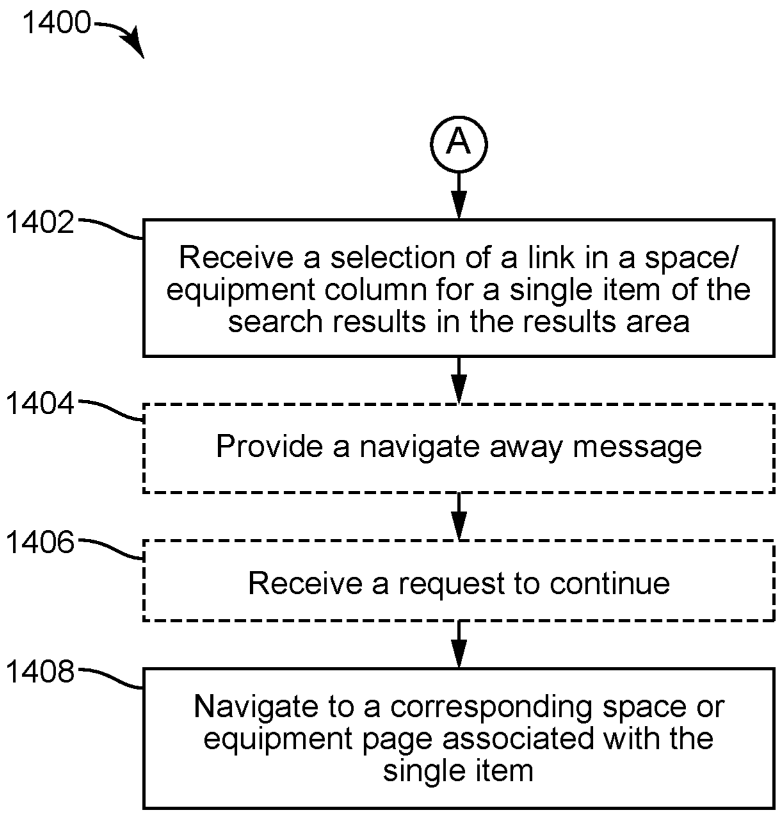
FIG. 14 is a flow diagram of a method for viewing a space or equipment page associated with an item from global search results, according to some embodiments.

Referring to FIG. 14, a method 1400 for viewing a space or equipment page associated with an item from global search results is shown according to an exemplary embodiment. According to an exemplary embodiment, method 1400 is an extension of method 1100. By way of example, the operator may view the space and/or equipment page of an item in the search results displayed by the search system (e.g., after step 1118, step 1122, etc.). At step 1402, the search system is configured to receive a selection of a link in a space/equipment column (e.g., space/equipment column 770, etc.) for a single item of the search results in the results area. At step 1404, the search system is configured to provide a navigate away message indicating that the search system has to navigate away from the current interface (e.g., search GUI 600, etc.) to display the space and/or equipment page associated with the selected link in the space/equipment column. At step 1406, the search system is configured to receive a request to navigate away (e.g., from search GUI 600, etc.). In some embodiments, the search system does not complete step 1404 and/or step 1406 (e.g., the operator has previously selected to not receive the navigate away message, etc.). At step 1408, the search system is configured to navigate to a corresponding space or equipment page associated with the single item.

Figure 15:
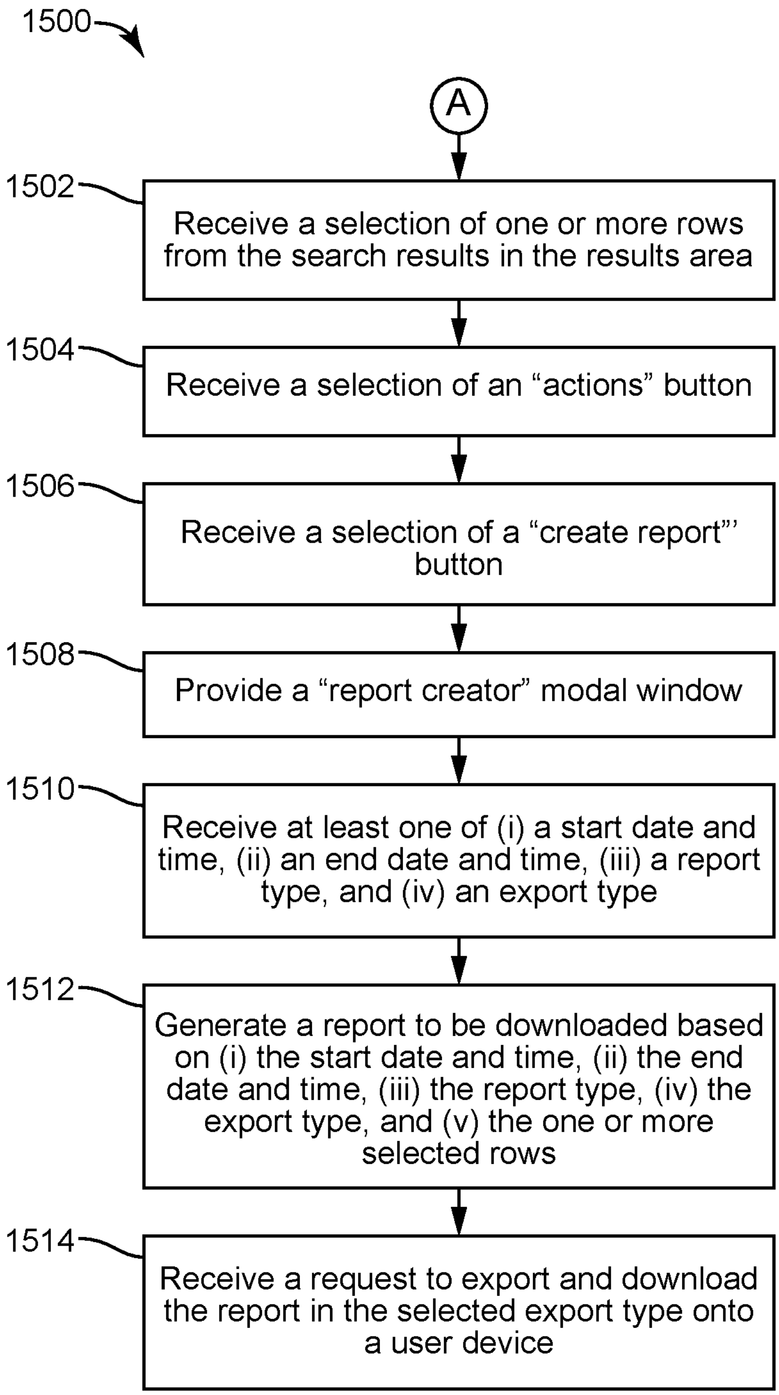
FIG. 15 is a flow diagram of a method for generating a report based on global search results, according to some embodiments.

Referring to FIG. 15, a method 1500 for generating a report based on global search results is shown according to an exemplary embodiment. According to an exemplary embodiment, method 1500 is an extension of method 1100. By way of example, the operator may generate a report from the search results displayed by the search system (e.g., after step 1118, step 1122, etc.). At step 1502, the search system is configured to receive a selection of one or more rows from the search results in the results area. At step 1504, the search system is configured to receive a selection of an "actions" button (e.g., actions button 680, etc.) in the filter area which causes the search system to display an actions drop-down menu. At step 1506, the search system is configured to receive a selection of a "create report" button (e.g., create report button 684, etc.) in the actions drop-down menu.

At step 1508, the search system is configured to provide a "report creator" modal window (e.g., report modal window 900, etc.) over the search results (e.g., in the same window as search GUI 600, etc.). The report creator modal window may include various fillable, selectable, and/or drop-down dialog boxes that are configured to receive various information or parameters used for generating a desired report. The dialog boxes may include a start date and time box (e.g., start date and time box 910, etc.), an end date and time box (e.g., end data and time box 920, etc.), a report type box (e.g., report type box 930, etc.), and/or an export type box (e.g., export type box 940, etc.). The start date and time box may facilitate the operator with inputting a start date and/or a start time at which data for the report should be gather from. The end date and time box may facilitate the operator with inputting an end date and/or an end time at which data for the report should be gather up to. The report type box may facilitate the operator with selecting a type of report that is desired from a drop-down menu. The type of report may include an activity report (e.g., alarms and audits for items selected in the advanced search and selected time frame, etc.), an alarm report, an audit report, and/or a trend report. The export type box may facilitate the operator with selecting a type of export file that is desired for the report from a drop-down menu. The type of export file may include a csv file, a pdf file, an excel file, a text file, and/or still another type of suitable file format.

At step 1510, the search system is configured to receive report criteria including (i) a start date and/or time (e.g., via start date and time box 910, etc.), (ii) an end date and/or time (e.g., via end date and time box 920, etc.), (iii) a report type (e.g., via report type box 930, etc.), and/or (iv) an export type (e.g., via export type box 940, etc.) from the operator. At step 1512, the search system is configured to generate a report to be downloaded onto the user device of the operator based on (i) the start date and time, (ii) the end date and time, (iii) the report type, (iv) the export type, and/or (v) the one or more selected rows. At step 1514, the search system is configured to receive a request to export and download the report in the selected export type onto the user device. The report may thereafter be saved, viewed, manipulated, printed, etc. via the user device. In some embodiments, the search system is configured to facilitate saving the report for future use. In some embodiments, the search system is configured to facilitate scheduling a report for future generation (e.g., periodic report generation, etc.).

Figure 16:
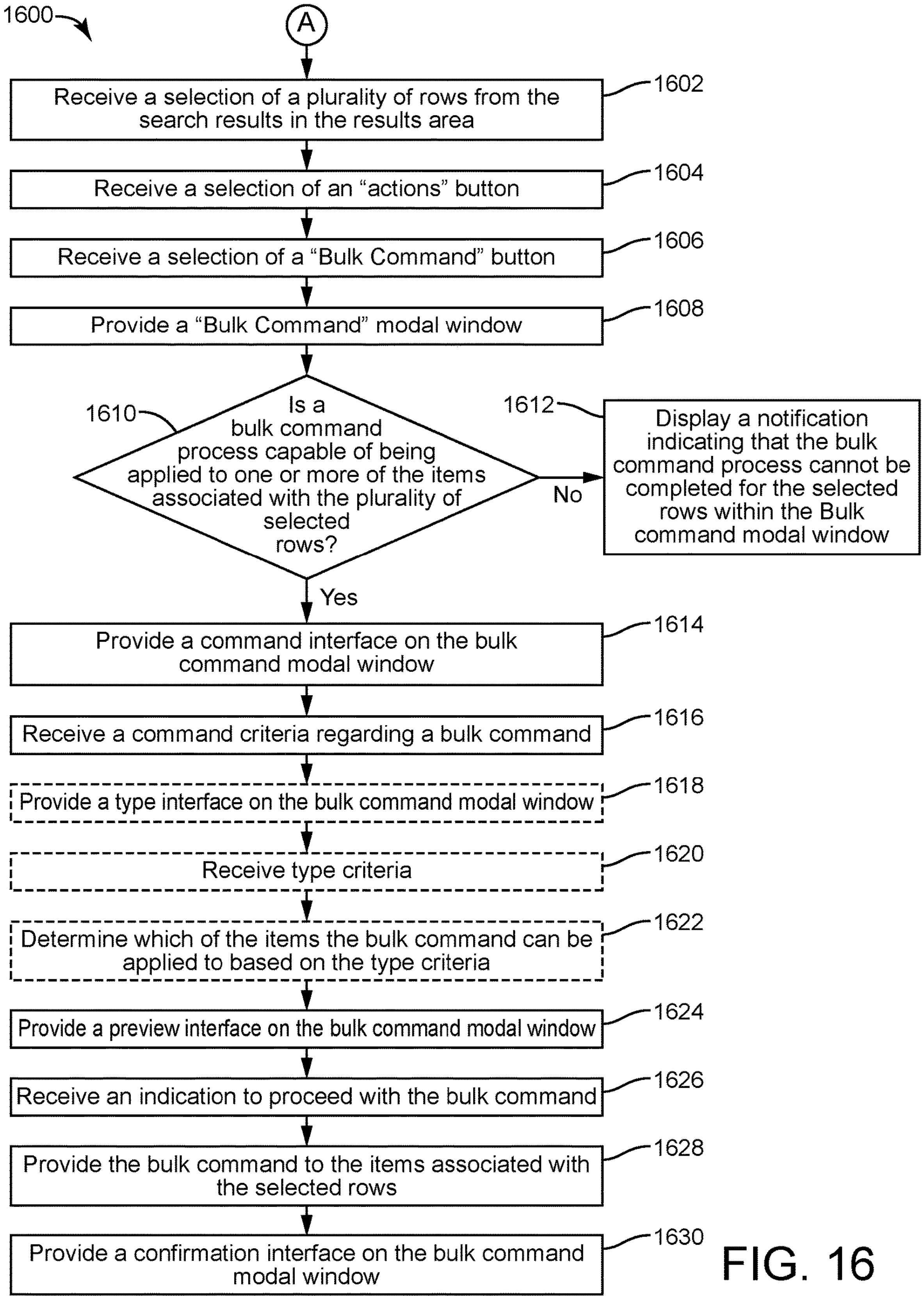
FIG. 16 is a flow diagram of a method for performing a bulk command process on a plurality of items from global search results, according to some embodiments.

Referring to FIG. 16, a method 1600 for performing a bulk command process (or similarly a bulk modification process) on a plurality of items from global search results is shown according to an exemplary embodiment. According to an exemplary embodiment, method 1600 is an extension of method 1100. By way of example, the operator may provide a bulk command (or a bulk modification) to a plurality of the search results displayed by the search system (e.g., after step 1118, step 1122, etc.). At step 1602, the search system is configured to receive a selection of a plurality of rows from the search results in the results area. At step 1604, the search system is configured to receive a selection of an "actions" button (e.g., actions button 680, etc.) in the filter area which causes the search system to display an actions drop-down menu. At step 1606, the search system is configured to receive a selection of a "bulk command" button (e.g., bulk command button 682, etc.) (or, alternatively, a "bulk modify" button) in the actions drop-down menu.

At step 1608, the search system is configured to provide a "bulk command" modal window (e.g., bulk command modal window 800, etc.) (or, alternatively, a "bulk modify" modal window, e.g., bulk modify modal window 1000) over the search results (e.g., in the same window as search GUI 600, etc.). The bulk command modal window may provide various interfaces that include fillable, selectable, and/or drop-down dialog boxes that are configured to receive various information or parameters used for providing a command to each of the items associated with the plurality of selected rows.

At step 1610, the search system is configured to determine whether a bulk command process (or bulk modification process) is capable of being applied to one or more of the items associated with the plurality of selected rows. At step 1612, the search system is configured to display a notification indicating that the bulk command process cannot be completed for the selected rows within the bulk command modal window in response to determining that the bulk command process cannot be applied to one or more of the items associated with the plurality of selected rows. At step 1614, the search system is configured to provide a command interface (e.g., command interface 810, etc.) on the bulk command modal window in response to determining that the bulk command process can be applied to one or more of the items associated with the plurality of selected rows. The command interface may include a command button (e.g., command button 812, etc.), a value button (e.g., value button 814, etc.), and an expiration section (e.g., expiration section 816, etc.). The command button may facilitate the operator with inputting and/or selecting an available command (e.g., common commands provided to the selected items, etc.) to provide to one or more of the items associated with the plurality of selected rows. The value button may facilitate the operator with providing a value (e.g., active, inactive, an operating parameter, etc.) for the command to one or more of the items associated with the plurality of selected rows. The expiration section may facilitate the operator with providing a duration for the command to remain in effect before expiring.

At step 1616, the search system is configured to receive command criteria (e.g., via the command box, the value box, the expiration section, etc.) regarding a bulk command to provide to the one or more items. In some embodiments, the search system is configured to proceed to steps 1618-1622. In some embodiments, the search system is configured to proceed to step 1624. At step 1618, the search system is configured to provide a type interface on the bulk command modal window in response to determining the plurality of selected rows are associated with different types of items. The type interface may provide an indication of the different types of items and what can be performed dependent upon the type of item. At step 1620, the search system is configured to receive type criteria from the operator (e.g., a selection of at least one of the types provided, etc.). At step 1622, the search system is configured to determine which of the items the bulk command can be applied to based on the type criteria.

At step 1624, the search system is configured to provide a preview interface (e.g., preview interface 830, etc.) on the bulk command modal window. The preview interface may provide an indication of the number of items the bulk command will affect, the command being provided, the type (if applicable), a table showing the items that will be affected (e.g., object, name, item reference, present value, etc.), etc. At step 1626, the search system is configured to receive an indication from the operator to proceed with the bulk command. At step 1628, the search system is configured to provide the bulk command to the items associated with the plurality of selected rows. At step 1630, the search system is configured to provide a confirmation interface (e.g., confirmation interface 850, etc.) on the bulk command modal window. The confirmation interface may provide the number of items the bulk command affected, the command that was provided, a table showing successful commands and failed commands, etc. It should be understood that method 1600 may similarly be applied to perform a bulk modification process.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the example embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A building management system comprising:

a search and control system comprising a processing circuit coupled to a building network, the building network including a plurality of devices of building equipment that operate to affect a variable state or condition within a building, the search and control system configured to:

provide a search interface having a filter section and a results section;

receive filter criteria within the filter section including at least one of a space filter, a space type filter, an equipment filter, an object type filter, an equipment definition filter, a point name filter, or a network item filter;

perform a search regarding the plurality of devices of building equipment based on the filter criteria;

return a set of search results based on the filter criteria;

display the set of search results in the results section, the set of search results including a plurality of rows of information;

dynamically update the information of the plurality of rows within the results section in real time without requiring user intervention in response to a quantity of the plurality of rows of the set of search results being less than a first threshold number of rows;

receive a selection of one or more of the plurality of devices of building equipment of the set of search results in the results section;

receive command criteria regarding a command to provide to the one or more selected devices of building equipment; and provide the command to the one or more selected devices of building equipment, the command causing the one or more selected devices of building equipment to affect the variable state or condition within the building.

2. The building management system of claim 1, wherein the search and control system is further configured to:

receive report criteria regarding a report to be generated for the one or more selected devices of building equipment, wherein the report criteria include at least one of a start date and time, an end date and time, a report type, or an export type; and generate the report based on the report criteria.

3. The building management system of claim 2, wherein the report type includes at least one of an activity report, an audit report, an alarm report, or a trend report.

4. The building management system of claim 3, wherein the search and control system is further configured to:

select a granularity to present trend information including time series data for the one or more selected devices of building equipment based on a selected time frame and in response to the trend report being selected; and present the trend information for the one or more selected devices of building equipment with the selected granularity.

5. The building management system of claim 4, wherein the search and control system is configured to display (i) raw trend data in response to the selected time frame being less than a first threshold, (ii) trend data aggregated on a daily basis in response to the selected time frame being greater than the first threshold, but less than a second threshold, and (iii) trend data aggregated on a monthly basis in response to the selected time frame being greater than the second threshold.

6. The building management system of claim 2, wherein the search and control system is configured to facilitate at least one of scheduling future generation of the report or saving the report for future use.

7. The building management system of claim 1, wherein the search and control system, when executing the receiving the filter criteria and the performing the search steps, is configured to:

receive at least one space filter;

retrieve all building equipment at least one of (i) associated with the at least one space filter selected or (ii) based on an authorization level of an operator;

subfilter the building equipment based on the equipment definition filter associated with each of the building equipment retrieved;

receive a selection of at least one equipment definition filter;

retrieve all points at least one of (i) associated with the at least one equipment definition filter selected or (ii) based on the authorization level of the operator; and subfilter the points based on the point name filter associated with each of the points retrieved;

receive a selection of at least one point name filter; and keep only the points associated with the at least one point name filter selected, each point associated with one of the plurality of building devices.

8. The building management system of claim 1, wherein the search and control system is configured to:

provide a single command dialog box for a single device of the set of search results in the results section in response to a selection of a link in the results section associated with the single device;

receive a single command for the single device via the single command dialog box; and implement the single command on the single device.

9. The building management system of claim 1, wherein the search and control system is configured to:

identify if at least one of the one or more selected devices cannot receive the command;

provide a notification indicating that the command cannot be completed for all of the one or more selected devices; and provide the command to the one or more selected devices that can receive the command.

10. The building management system of claim 1, wherein the search and control system is configured to provide a confirmation interface after providing the command, the confirmation interface providing information regarding at least one of a number of devices the command affected, a type of command that was provided, an indication of successful commands, or an indication of failed commands, wherein the successful commands are grouped together and the failed commands are grouped together separate from the successful commands.

11. The building management system of claim 1, wherein the search and control system is configured to return the set of search results within the results section based on the filter criteria and an authorization level of an operator.

12. The building management system of claim 1, wherein the search and control system is configured to provide a notification indicating that the filter criteria needs to be refined in response to the set of search results not including any items.

13. The building management system of claim 1, wherein the search and control system is configured to display the set of search results in the results section and provide a notification indicating the information of the plurality of rows is not being dynamically updated in response to the quantity of the plurality of rows being greater than the first threshold number of rows, but less than a second threshold number of rows.

14. The building management system of claim 13, wherein the search and control system is configured to provide a notification indicating that the quantity of the plurality of rows exceeds a maximum number of search results and that the filter criteria needs to be refined in response to the quantity of the plurality of rows being greater than the second threshold number of rows.

15. The building management system of claim 1, wherein the search and control system is configured to:

receive modification criteria regarding at least one attribute of the one or more selected devices of building equipment to be modified; and perform a modification to the at least one attribute of the one or more selected devices of building equipment based on the modification criteria, the modification causing the at least one attribute of the one or more selected devices of building equipment to change.

16. A method for generating a report based on search results, the method comprising:

automatically detecting, by a search and control system coupled to a building network, a plurality of items connected to the building network, the plurality of items including at least one of building equipment, data points provided by the building equipment, or building spaces affected by the building equipment;

providing, by a search and control system on a user device, a search interface having a filter section and a results section;

receiving, by the search and control system from the user device, filter criteria within the filter section regarding the plurality of items;

performing, by the search and control system, a search regarding the plurality of items based on the filter criteria;

returning, by the search and control system, a set of search results within the results section based on at least one of the filter criteria or an authorization level of a user of the user device;

receiving, by the search and control system from the user device, a selection of one or more items of the set of search results in the results section;

receiving, by the search and control system from the user device, report criteria regarding the report to be generated for the one or more items of the set of search results associated with the selection, wherein the report criteria includes a selected time frame and a trend report selection; and generating, by the search and control system, a trend report including trend data based on the report criteria for viewing on the user device, wherein the trend data is provided in the trend report with a varying level of granularity based on the selected time frame such that the trend report displays (i) raw trend data for the one or more items, (ii) trend data aggregated on a daily basis for the one or more items, or (iii) trend data aggregated on a monthly basis for the one or more items;

wherein the trend report displays the raw trend data for the one or more items in response to the selected time frame being less than a first threshold, wherein the trend report displays the trend data aggregated on a daily basis for the one or more items in response to the selected time frame being greater than the first threshold, but less than a second threshold, and wherein the trend report displays the trend data aggregated on a monthly basis for the one or more items in response to the selected time frame being greater than the second threshold.

17. The method of claim 16, wherein the set of search results are returned based on the filter criteria and the authorization level of the user.

18. A method for performing a bulk command process on search results, the method comprising:

providing, by a search and control system on a user device, a search interface having a filter section and a results section, wherein the search and control system is coupled to a building network including a plurality of devices of building equipment that operate to affect a variable state or condition within a building;

receiving, by the search and control system from the user device, filter criteria within the filter section regarding the plurality of devices of building equipment;

performing, by the search and control system, a search regarding the plurality of devices of building equipment based on the filter criteria;

returning, by the search and control system, a set of search results within the results section based on at least one of the filter criteria or an authorization level of a user of the user device;

receiving, by the search and control system from the user device, a selection of a plurality of items of the set of search results in the results section;

receiving, by the search and control system from the user device, command criteria regarding a bulk command to provide to the plurality of devices of building equipment associated with the plurality of items of the set of search results selected; and providing, by the search and control system, the bulk command to the plurality of devices of building equipment associated with the plurality of items of the set of search results selected, the bulk command causing the plurality of devices of building equipment associated with the plurality of items of the set of search results selected to affect the variable state or condition within the building.

19. The method of claim 18, further comprising providing, by the search and control system on the user device, a confirmation interface after providing the bulk command, wherein the confirmation interface provides information regarding a first subset of the plurality devices that the bulk command was successfully provided to and a second subset of the plurality devices that the bulk command was unsuccessfully provided to, and wherein first information regarding the first subset of the plurality of devices is grouped together and second information regarding the second subset of the plurality device is grouped together separate from the first information within the confirmation interface.

* * * * *